US012320492B1

(12) United States Patent
Shiner et al.

(10) Patent No.: US 12,320,492 B1
(45) Date of Patent: Jun. 3, 2025

(54) LIGHTING FIXTURE SYSTEMS

(71) Applicant: Leviton Manufacturing Co., Inc., Melville, NY (US)

(72) Inventors: Zachary C. Shiner, MAdison, WI (US); Timne Bilton, Arcadia, CA (US); Robert Nankil, Fullerton, CA (US); Yang Liu, Irvine, CA (US); Adam Zepeda, Anaheim, CA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 18/527,840

(22) Filed: Dec. 4, 2023

(51) Int. Cl.

| | |
|---|---|
| ***F21V 11/12*** | (2006.01) |
| ***F21S 2/00*** | (2016.01) |
| ***F21S 4/28*** | (2016.01) |
| ***F21S 8/02*** | (2006.01) |
| ***F21V 3/02*** | (2006.01) |
| ***F21V 7/04*** | (2006.01) |
| ***F21V 17/06*** | (2006.01) |
| *F21Y 115/10* | (2016.01) |

(52) U.S. Cl.
CPC ............... *F21S 8/026* (2013.01); *F21S 2/005* (2013.01); *F21V 17/06* (2013.01); *F21Y 2115/10* (2016.08)

(58) Field of Classification Search
CPC .......... F21S 8/026; F21S 2/005; F21V 17/06; F21Y 2115/10
See application file for complete search history.

(56) References Cited

U.S. PATENT DOCUMENTS

| | | | |
|---|---|---|---|
| 7,887,216 | B2 | 2/2011 | Patrick |
| 8,272,756 | B1 | 9/2012 | Patrick |
| 8,382,322 | B2 | 2/2013 | Bishop |
| 8,613,525 | B2 | 12/2013 | Shimizu |

(Continued)

FOREIGN PATENT DOCUMENTS

| | | | |
|---|---|---|---|
| CA | 2764114 | A1 * | 7/2012 |
| CA | 2981065 | A1 | 4/2018 |

(Continued)

OTHER PUBLICATIONS www.birchwoodlighting.com, "Jill Asymmetric, Drop-Lens Recessed Linear Luminaire," Birchwood lighting a Leviton company, Dec. 11, 2023, 2 pages.

(Continued)

*Primary Examiner* — Tracie Y Green
(74) *Attorney, Agent, or Firm* — KDW Firm PLLC

(57) ABSTRACT

A lighting apparatus that includes a housing having first and second sidewalls, a top housing wall disposed between the first and second sidewalls, and an open end disposed between the sidewalls and opposite the top housing wall. The housing includes a housing interior enclosed by the sidewalls and the top housing wall. The apparatus includes a lighting lens housing having a first and second lens sidewalls and a lens panel disposed between the lens sidewalls, where the lighting lens housing has a lens interior. The lens sidewalls block transmission of light. The lighting lens housing is removably secured within the housing interior, wherein, upon removably securing the lighting lens housing within the housing interior, at least one of the first and second lens sidewalls is positioned at an offset and adjacent the open end of the housing.

7 Claims, 16 Drawing Sheets

(56) References Cited

U.S. PATENT DOCUMENTS

| | | | | |
|---|---|---|---|---|
| D700,732 | S | 3/2014 | Clark | |
| D702,390 | S | 4/2014 | Clark | |
| D702,391 | S | 4/2014 | Clark | |
| 8,794,795 | B2 | 8/2014 | Yaphe | |
| 8,915,613 | B2 | 12/2014 | Clark | |
| 9,091,422 | B2 | 7/2015 | Greenfield | |
| 9,170,007 | B2 | 10/2015 | Erion | |
| 9,261,258 | B2 | 2/2016 | Sears | |
| 9,279,544 | B1 | 3/2016 | Dankelmann | |
| 9,328,874 | B2 | 5/2016 | Demuynck | |
| 9,388,948 | B2 | 7/2016 | Demuynck | |
| 9,565,769 | B2 | 2/2017 | Dankelmann | |
| 9,625,130 | B2 | 4/2017 | Bishop | |
| D790,746 | S | 6/2017 | Ferrier | |
| 10,066,812 | B1 | 9/2018 | Esteves | |
| 10,100,988 | B2 | 10/2018 | Rodgers | |
| 10,215,380 | B2 | 2/2019 | Yaphe | |
| D870,956 | S | 12/2019 | Mier-Langner | |
| 10,520,170 | B2 | 12/2019 | DeBruin | |
| 10,584,857 | B2 | 3/2020 | Yaphe | |
| 10,612,747 | B2 | 4/2020 | Rodgers | |
| 10,677,427 | B2 | 6/2020 | Esteves | |
| D905,326 | S | 12/2020 | Mier-Langner | |
| 10,962,204 | B2 | 3/2021 | Esteves | |
| D919,156 | S | 5/2021 | Mier-Langner | |
| D919,166 | S | 5/2021 | Mier-Langner | |
| D921,269 | S | 6/2021 | Mier-Langner | |
| 11,079,082 | B2 | 8/2021 | Yaphe | |
| D931,519 | S | 9/2021 | Mier-Langner | |
| 11,131,444 | B2 | 9/2021 | James | |
| 11,339,932 | B2 | 5/2022 | Meir | |
| 11,353,200 | B2 | 6/2022 | Shohat | |
| 11,585,501 | B2 | 2/2023 | Yaphe | |
| 11,592,158 | B2 | 2/2023 | Yeo | |
| 11,708,966 | B2 | 7/2023 | Shohat | |
| 11,709,413 | B2 | 7/2023 | Kaya | |
| 2006/0027828 | A1 | 2/2006 | Kikuchi | |
| 2007/0047229 | A1 | 3/2007 | Lee | |
| 2011/0304270 | A1 | 12/2011 | Scarpelli | |
| 2021/0048169 | A1 * | 2/2021 | Dahlen | F21V 21/04 |
| 2021/0222847 | A1 | 7/2021 | Yaphe | |
| 2021/0332961 | A1 | 10/2021 | Yaphe | |
| 2022/0090745 | A1 * | 3/2022 | Czech | F21S 4/28 |
| 2023/0194059 | A1 | 6/2023 | Yaphe | |
| 2024/0102632 | A1 * | 3/2024 | Dong | F21V 13/12 |

FOREIGN PATENT DOCUMENTS

| | | | |
|---|---|---|---|
| CA | 2821751 | C | 1/2020 |
| CA | 3114524 | A1 | 10/2022 |

OTHER PUBLICATIONS www.pinnacle-ltg.com, “Edge All Spaces,” Pinnacle Architectural Lighting, Dec. 2020, 10 pages.

Www.finelite.com, “HP-2 with Tailored Lighting,” Finelite Better Lighting, High Performance 2" Aperture LED Collection, Feb. 2023, 31 pages.

axislighting.com, “Graze Perfekt,” New optics technology for exciting light grazing, Dec. 11, 2023, 6 pages.

coronetled.com, “Flawless-2 wall grazer,” Coronet designed and built in the USA, a CarbonNeutral company, Dec. 2023, 6 pages.

axislighting.com, “Wall Wash Perfekt,” High-performance wall washer featuring SurroundLiteTM technology for 10-foot spacing, Dec. 11, 2023, 6 pages.

coronetled.com, “LSR1 recessed,” Coronet designed and built in the USA, a carbonNeutral company, Jul. 2023, 4 pages.

www.axislighting.com, “Graze Perfekt: Linear Perimeter—Recessed,” Graze Perfekt-Perimeter-Recessed. SPEC, Sep. 8, 2023, pp. 1-9 [online source] https://www.axislighting.com/.

Finelite, “Finelite High Performance 2" Aperture (HP-2) Pendant,” Better Lighting, A brand of legrand, 2023, 15 pages.

Axis, “Linear LED Portfolio,” Architectural Lighting Innovations, Axis Lighting, 2017, 96 pages.

Axis, “SurroundLite,” Architectural Lighting Innovations, Axis Lighting, 2018, 82 pages.

www.axislighting.com, “Wall Wash Perfekt: Surface Wall Wash,” WWS.LED-B3.SPEC, Aug. 1, 2023, pp. 1-4 [online source] https://www.axislighting.com/.

www.axislighting.com, “Beam2Square: Recessed Mount,” B2SQB2SQR.LED.SPEC, Dec. 14, 2023, pp. 1-10, [online source] https://www.axislighting.com/.

www.axislighting.com, “Wall Wash Perfekt: Recessed Wall Wash,” WWR.LED-B3.SPEC, Aug. 1, 2023, pp. 1-5 [online source] https://www.axislighting.com/.

* cited by examiner

LIGHTING FIXTURE SYSTEMS

TECHNICAL FIELD

The present disclosure is generally directed to electrical systems, and in particular to linear lighting fixture systems.

BACKGROUND

Lighting fixtures provide illumination to various spaces, e.g., rooms in houses, office spaces in buildings, large commercial warehouses, and other spaces. Typically, such lighting fixtures are suspended from a ceiling or attached to a wall and are connected to sources of electricity. Such connections may be direct and/or through one or more switches allowing uses to control when lighting fixtures are on or off. Some existing lighting fixtures, especially, those for use in large spaces (e.g., offices, warehouses, etc.) are typically assembled in a pattern, e.g., linearly. Such assembly may require forming connections between different lighting fixtures. The connections are typically not optically tight, allowing unwanted light to escape from joints formed between lighting fixtures. Moreover, existing lighting fixture systems are difficult to service, oftentimes requiring access to electrical components that are far away from the actual lighting fixtures, creating difficulties in locating and resolving issues.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

In some implementations, the current subject matter relates to a lighting apparatus. The apparatus may include a housing having a first housing sidewall and a second housing sidewall. Each of the first and second housing sidewalls may have a first end and a second end. The apparatus may also include a lighting lens housing having a first lens sidewall, a second lens sidewall, and a lens panel having a first end and a second end, wherein the lens panel is disposed between the first and second lens sidewalls. At least one of the first and second lens sidewalls may be configured to block transmission of light. The lighting lens housing may be configured to be attached to the housing. Upon attaching the lighting lens housing to the housing, the first end of the lens panel may be offset from the first end of the first housing sidewall and the first end of the second housing sidewall.

In some implementations, the current subject matter may include one or more of the following optional features. At least one of the first and second lens sidewalls may be offset from the first end of the first housing sidewall and the first end of the second housing sidewall.

In some implementations, the second end of the lens panel may be offset from the second end of the first housing sidewall and the second end of the second housing sidewall. The first end of the lens panel may be configured to extend beyond the first ends of the first and second housing sidewalls. The second ends of the first and second housing sidewalls may be configured to extend beyond the second end of the lens panel. Alternatively, or in addition, the first end of the lens panel may be configured to extend beyond the first ends of the first and second housing sidewalls. The second end of the lens panel may be configured to extend beyond the second ends of the first and second housing sidewalls. In some implementations, the first ends of the first and second housing sidewalls may be configured to extend beyond the first end of the lens panel. The second ends of the first and second housing sidewalls are configured to extend beyond the second end of the lens panel.

In some implementations, the current subject matter relates to a lighting system. The lighting system may include a first lighting apparatus and a second lighting apparatus. Each of the first and second lighting fixtures may have a housing having a first housing sidewall and a second housing sidewall. Each of the first and second housing sidewalls may have a first end and a second end, and a lighting lens housing having a first lens sidewall, a second lens sidewall, and a lens panel having a first end and a second end, where the lens panel may be disposed between the first and second lens sidewalls, and where at least one of the first and second lens sidewalls may be configured to block transmission of light. The lighting lens housing may be configured to be attached to the housing. Upon attaching the lighting lens housing to the housing, the first end of the lens panel may be offset from the first end of the first housing sidewall and the first end of the second housing sidewall. Upon connection of the first lighting apparatus and the second lighting apparatus, the first ends of the first and second housing sidewalls of the housing of the first lighting apparatus may form a first joint with the second ends of the first and second housing sidewalls of the housing of the second lighting apparatus. The first end of the lens panel of the lighting lens of the first lighting apparatus may form a second joint with the second end of the lens panel of the lighting lens of the second lighting apparatus. The first joint may be offset from the second joint.

In some implementations, the current subject matter relates to a lighting apparatus. The lighting apparatus may include a housing having a first housing sidewall, a second housing sidewall, a top housing wall disposed between the first and second housing sidewalls, and an open end disposed between the first and second housing sidewalls and opposite the top housing wall. The housing may have a housing interior enclosed by the first and second housing sidewalls and the top housing wall. The apparatus may include a lighting lens housing having a first lens sidewall, a second lens sidewall, a lens panel disposed between the first and second lens sidewalls. The lighting lens housing may have a lens interior. The first and second lens sidewalls may block transmission of light. The lighting lens housing may be configured to be removably secured to the housing interior, where, upon removably securing the lighting lens housing to the housing interior, at least one of the first and second lens sidewalls may be configured to be positioned at an offset with respect to the open end of the housing.

In some implementations, the current subject matter may include one or more of the following optional features. In some implementations, a first end of the first lens sidewall may extend beyond a first end of the first housing sidewall, and a first end of the second lens sidewall may extend beyond a first end of the second housing sidewall. A second end of the first housing sidewall may extend beyond a second end of the first lens sidewall, and a second end of the second housing sidewall may extend beyond a second end of the second lens sidewall.

In some implementations, at least a portion of the first lens sidewall and at least a portion of the second lens sidewall may be non-transparent to light.

In some implementations, the apparatus may include a locking mechanism disposed in the top housing wall for securing the housing to another housing. The locking mechanism may include a protruding locking tab configured to interlock with a locking recess of another locking mechanism of the other housing upon the housing being coupled to the other housing.

In some implementations, the locking mechanism may include a locking screw configured to secure the protruding locking tab to the top housing wall.

In some implementations, the lighting lens housing may be configured to snap fit into the housing.

In some implementations, the lens panel may be at least partially transparent to light.

In some implementations, the apparatus may include a liner configured to be positioned within the lighting lens housing, and one or more lighting electrical components detachably secured to the liner. One or more lighting electrical components may generate light for transmission through the lighting lens at a predetermined angle. The predetermined angle may be determined based on an angular position of the liner within the lighting lens housing. The housing may be coupled to one or more connectors configured to suspend the housing from a ceiling. One or more lighting electrical components may be electrically coupled to a source of electrical power via the one or more connectors. The source of electrical power may be positioned at the ceiling. One or more connectors may be configured to protrude through an opening in the ceiling. The opening may be configured to be covered using a removable canopy. One or more connectors may protrude into the opening in the ceiling through the removable canopy at an offset with respect to at least one of: a center of the removable canopy and a center of the opening in the ceiling.

In some implementations, at least a portion of the first lens sidewall may be inclined at a first angle with respect to the lighting lens panel and at least a portion of the second lens sidewall may be inclined at a second angle with respect to the lighting lens panel. The first and second angles may be substantially equal.

In some implementations, the liner may be removably secured to the first lens sidewall and to the second lens sidewall.

In some implementations, the liner may be snap-fit removably secured to the first lens sidewall and to the second lens sidewall.

Further features and advantages of at least some of the exemplary embodiments of the current subject matter, as well as the structure and operation of various exemplary embodiments of the current subject matter, are described in detail below with reference to the accompanying drawings.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
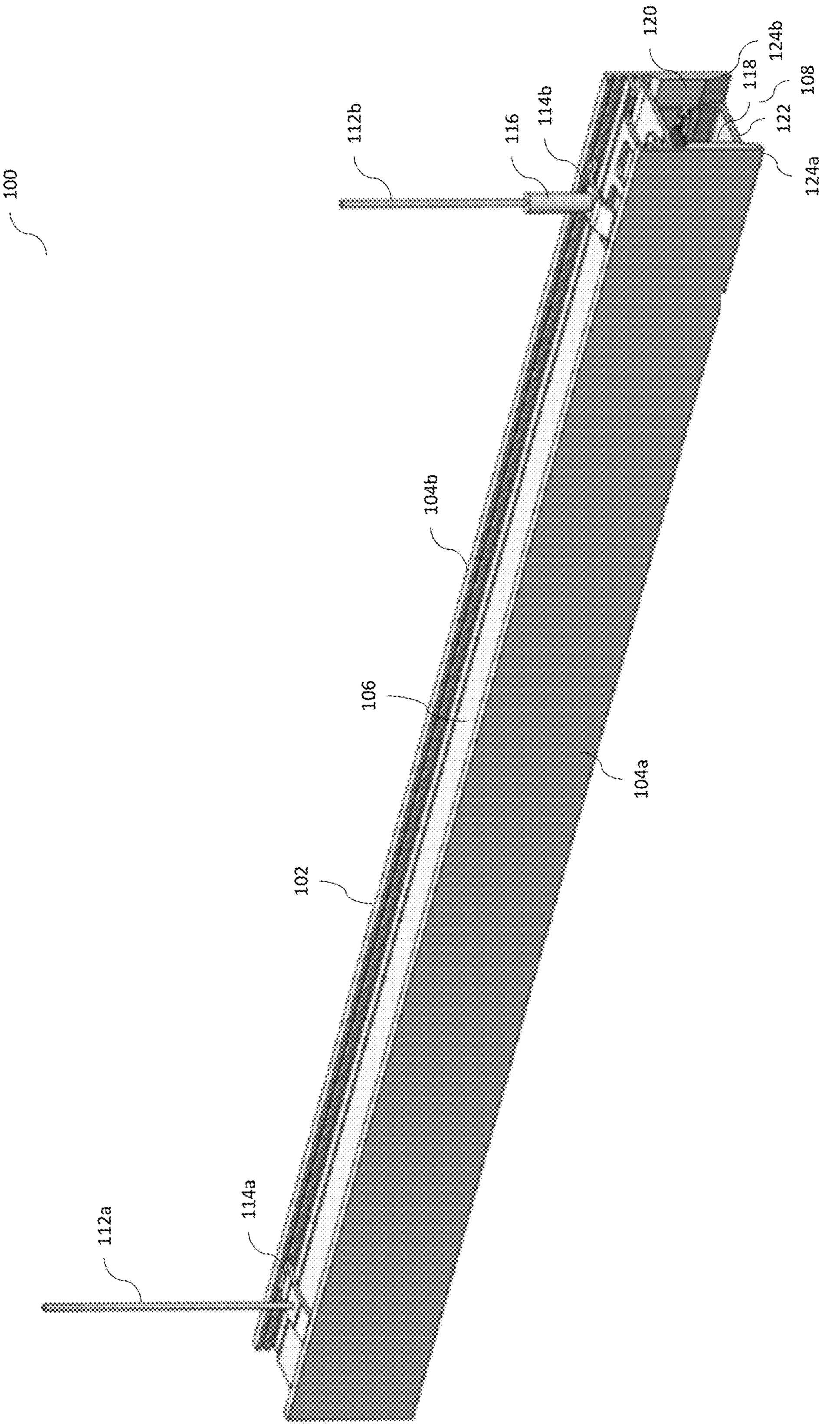
FIG. 1 illustrates an example lighting fixture system, according to some implementations of the current subject matter.

It should be understood that the drawings are not necessarily to scale and that the disclosed examples are sometimes illustrated diagrammatically and/or in partial views. In certain instances, details that are not necessary for an understanding of the disclosed methods and devices or which render other details difficult to perceive may have been omitted. It should be further understood that this disclosure is not limited to the particular examples illustrated herein. In the drawings, like numbers refer to like elements throughout unless otherwise noted.

DETAILED DESCRIPTION

To address these and potentially other deficiencies of currently available solutions, one or more implementations of the current subject matter relate to methods, systems, articles of manufacture, and the like that can, among other possible advantages, provide linear lighting fixtures.

In some implementations, the current subject matter relates to a lighting fixture or apparatus, which may be suspended from a ceiling, attached to a wall, and/or secured to any other desired surface for the purposes of providing illumination to a space (e.g., room, office, etc.). The lighting fixture may include a housing that may have first and second housing sidewalls that may be joined at the top using a top housing wall positioned between and secured to the sidewalls, thereby forming a unitary structure. The housing may also include an open end that may be disposed between the sidewalls and opposite the top housing wall. The sidewalls and the top housing wall may enclose an interior, which may accommodate positioning of lighting lens, lighting electrical components, and/or various other components.

The housing may also include a locking mechanism, which may be disposed in the top housing wall. The locking mechanism may be used to secure the housing to another housing, which may include a counterpart locking mechanism. The locking mechanism may include a protruding locking tab that may be configured to interlock with a locking recess of another locking mechanism in a housing of another lighting fixture upon the housings of the lighting fixtures being coupled. Moreover, the locking mechanism may include a locking screw that may be configured to secure the protruding locking tab to the top housing wall. Additionally, a depth stop may be included in locking mechanism for the purposes of mating with a recess in a top housing wall of another lighting fixture upon coupling of two lighting fixtures together. Thus, to connect two lighting fixtures together, one lighting fixture's top wall may include a locking tab protruding away from one end of the top wall and another lighting fixture's top wall may include a locking recess configured to receive and interlock with the protruding locking tab. The depth stop may be configured to prevent movement of housings during coupling beyond certain points to thereby prevent any damage that may occur to the housings, the locking mechanism, and/or any other components.

The lighting fixture may also include a lighting lens housing having first and second lens sidewalls, a lens panel coupled to and positioned between the first and second lens sidewalls. The lighting lens housing may also have a lens interior. The lighting lens housing may be configured to snap fit within the housing. In some implementations, the lens panel may at least be partially transparent to light.

To providing lighting, one or more lighting electrical components may be detachably secured to a liner within the lighting lens housing. For example, the lighting electrical components may include one or more light emitting diodes (LEDs). The lighting electrical components may generate light for transmission through the lighting lens at a predetermined angle. The angle may be determined based on an angular position of the liner within the lighting lens housing. For example, the light may be transmitted perpendicularly to the lighting lens and/or at an angle to the lighting lens. In some implementations, the liner may be removably secured to the first and second lens sidewalls. For example, the liner may be snap-fit removably secured to the first and second lens sidewalls.

In some implementations, the first and second lens sidewalls may be configured to block transmission of light. For example, the lens sidewalls may be manufactured from an opaque materials that blocks light.

Moreover, the lighting lens housing may be configured to be removably secured within the housing interior. In particular, upon removably securing the lighting lens housing within the housing interior, the lens panel along with the lens sidewalls may be configured to be positioned at an offset and adjacent the open end of the housing. The offset may be defined by respective portions of the lens sidewalls (along with the lens panel) extending beyond ends of the housing sidewalls. Alternatively, or in addition, the offset may be defined by respective portions of housing sidewalls extending beyond ends of the lens sidewalls (and the lens panel). Moreover, the portions of the lens sidewalls may be non-transparent to light.

In some implementations, at least a portion of the first lens sidewall may be inclined at a first angle with respect to the lighting lens panel. Also, at least a portion of the second lens sidewall may be inclined at a second angle with respect to the lighting lens panel. The first and second angles may be substantially equal. This may form a trapezoidal shape of the lighting lens housing that may provide a secure fit when positioning the lighting lens housing within the interior of the housing. To ensure that the lighting lens housing retains within the interior of the housing, the first lens sidewall may include a first locking feature and the second lens sidewall may include a second locking feature. The first and second locking features may be configured to removably secure the lighting lens housing within the housing upon insertion of the lighting lens housing into the interior of the housing.

In some implementations, the housing may be coupled to one or more connectors configured to suspend the housing from a ceiling (and/or any other structure). Further, the lighting electrical components may electrically be coupled to a source of electrical power via such connectors. For example, electrical wiring may be configured to extend either alongside the connectors and/or through an interior of the connectors, and/or in any other way. Moreover, the source of electrical power may be positioned at the ceiling. For example, the source of electrical power may include an LED driver, which may be electrically coupled to the LEDs.

FIG. 1 illustrates an example lighting fixture system 100, according to some implementations of the current subject matter. While the system 100 is shown as a linear system, as can be understood, the system may be any other type of system and/or may have any desired shape (e.g., circular, square, rectangular, triangular, multi-dimensional, etc.). The system 100 may be positioned in any desired location for illumination of space (interior and/or exterior) at that location, such as, for example, but not limited to, a room, a warehouse, an office, and/or any other location. The system 100 may be configured for mounting to any horizontal surface (e.g., a ceiling), a vertical surface (e.g., a wall), a diagonal surface (e.g., a wall and/or a ceiling), and/or any other type of surface. The system 100 may include any desired types of light sources (e.g., halogen, incandescent, fluorescent, and/or any other type of light bulbs or elements, LED light bulbs or elements, CFL bulbs or elements, and/or any other types of light sources) for providing illumination to a space where the system 100 is mounted.

The system 100 may provide ease of installation, alignment, and connection with other lighting systems (e.g., other systems 100). In particular, the system 100 may greatly reduce the level of skill and/or precision that may be required to connect lighting systems, simplify the manner in which joining of such systems may be tightened, reduce an amount of undesired light emissions between joined systems 100, enable custom-sizing of the system 100 during manufacture and/or installation (e.g., through custom-cutting of elements of system 100), and provide an ease of access to its various electrical components for installation and servicing (e.g., through use of local power sources/LED drivers rather than remote ones).

Referring to back to FIG. 1, the system 100 may include a lighting fixture housing 102 that may be configured to house a lighting lens housing 118. The housing 102 may have a first sidewall 104*a*, a second sidewall 104*b*, a top wall 106, and an open end 108. The top wall 106 may be coupled to the first and second sidewalls 104 and being disposed opposite to the open end 108. The sidewalls 104 and top wall 106 may enclose an interior 120 of the housing 102.

The top wall 106 may be coupled to one or more brackets 114*a* and 114*b*. The brackets 114*a* and 114*b* may be coupled to one or more suspension cables, wires, or connectors (terms used interchangeably herewith) 112*a* and 112*b*, respectively. The connectors 112*a* and 112*b* may suspend the housing 102 from a horizontal or a diagonal surface, such as, for example, a ceiling. One or both of the connectors 112 may be configured for accommodating protrusion of electrical wiring extending from one or more power sources (e.g., an LED driver) that may be disposed in the ceiling (not shown in FIG. 1). As shown in FIG. 1, the connector 112*b* may be coupled to an electrical wire housing 116. The wire housing 116 may have a larger diameter than the diameter of the connector 112*b*, so that the wire housing 116 may allow protrusion of electrical wiring into the lighting lens housing 118 as well as coupling to the bracket 114*b*.

Alternatively, or in addition, the brackets 114*a* and 114*b* may be used for mounting the housing to a vertical and/or a diagonal surface, such as, for example, a wall. In this case, the electrical wiring may be protruded via a cable and/or directly from one or more power sources (e.g., an LED driver) that may be hidden behind the wall (not shown in FIG. 1).

The interior 120 may accommodate insertion and/or positioning of the lighting lens housing 118. Upon positioning of the lighting lens housing 118 in the interior 120, the lighting lens or light engine (terms used interchangeably herein) 122 may be positioned adjacent the open end 108 of the housing 102. In some example implementations, the lighting lens 122 may be flush with the edge 124*a* of the sidewall 104*a* and edge 124*b* of the sidewall 104*b*.

In some implementations, the lighting lens housing 118 may be removably secured within the interior 120 of the housing 102. This may allow easy removal of the lighting lens housing 118 from the interior 120, such as, for example, for servicing, repairs and/or replacement of parts, e.g., electrical parts of the lighting lens housing 118 (e.g., LEDs of the lighting component, electrical wires, etc.), mechanical parts (e.g., structural parts of the lighting lens housing 118), optical (e.g., lens 122 of the lighting lens housing 118), and/or any other parts. In some example, non-limiting implementations, the lighting lens housing 118 may be snap-fit within the interior 120 of the housing 102. As can be understood, any other ways of removably securing the lighting lens housing 118 are possible. Alternatively, or in addition, the lighting lens housing 118 may be secured using one or more screws, bolts, rivets, and/or any other ways.

Figure 2:
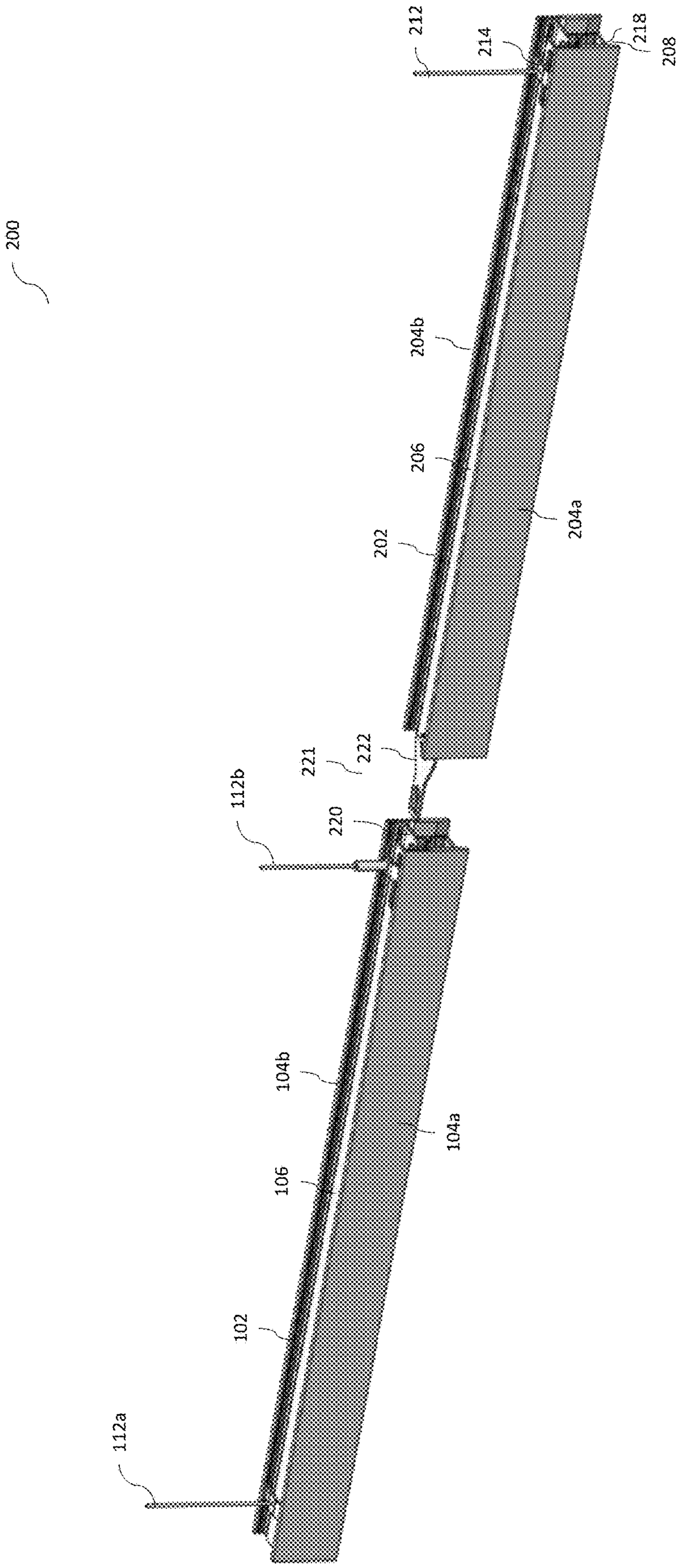
FIG. 2 illustrates an example lighting fixture system, according to some implementations of the current subject matter.

FIG. 2 illustrates an example lighting fixture system 200, according to some implementations of the current subject matter. As shown in FIG. 2, the lighting fixture system 200 may include two lighting fixture housings, i.e., lighting fixture housing 102 and a lighting fixture housing 202. As can be understood, the lighting fixture system 200 may include any number of lighting fixture housings. For example, in an office building setting, several of the lighting fixture housings may be joined together to provide illumination to a large space (e.g., a conference room, an office space with multiple cubicles, etc.). The lighting fixture housings may be coupled together mechanically and/or electrically. For instance, the lighting fixture housing 102 may be electrically coupled to a source of electrical power and the lighting fixture housing 202 may be connect to one or more electrical contacts within the lighting fixture housing 102 for providing electrical power to its electrical components. As such, the lighting fixture housings 102 and 202 may be connected in series to the source of electrical power.

As shown in FIG. 2, the lighting fixture housing 202 may be similar to the lighting fixture housing 102. In particular, it may house a lighting lens housing 218. The housing 202 may have a first sidewall 204*a*, a second sidewall 204*b*, a top wall 206, and an open end 208. The top wall 206 may be coupled to the sidewalls 204 and may be disposed opposite to the open end 208. The sidewalls 204 and top wall 206 may enclose an interior of the housing 202.

Further, the top wall 206 may be coupled to a bracket 214. The bracket 214 may be coupled to a suspension cable, wire, or connector (terms used interchangeably herewith) 212. Once the lighting fixture housing 202 is coupled to the lighting fixture housing 102, the connectors 112*a*, 112*b*, and 212 may suspend the combined lighting fixture housing (formed from housings 102 and 202) from a horizontal or a diagonal surface, such as, for example, a ceiling. The connector 112*b* may be configured to accommodate protrusion of electrical wiring one or more power sources (e.g., an LED driver) that may be disposed in the ceiling (not shown in FIG. 2) so as to provide power to both lighting fixture housings 102 and 202.

The lighting fixture housing 102 may include a first portion 220 of a locking mechanism 221 and the lighting fixture housing 202 may include a second portion 222 of the locking mechanism 221. The locking mechanism 221 may be configured interlock the lighting fixture housings 102 and 202 together by interlocking the first and second portions 220 and 222. In particular, the first portion 220 may be disposed on the top wall 116 of the lighting fixture housing 102. The second portion 222 may be disposed on the top wall 216 of the lighting fixture housing 202. The first portion 220 may be configured to receive the second portion 222 upon coupling of the first and second portions 220 and 222. As can be understood, a lighting fixture housing may include a first portion of the locking mechanism disposed at one end of the lighting fixture housing and a second portion disposed at an opposite end of the housing. Alternatively, or in addition, the lighting fixture housing may include only the first portions or only the second portions of the locking mechanism disposed at both ends of the housing. Moreover, the lighting fixture housing may only include one of the first and second portions of the locking mechanism disposed at one end and no portions of the locking mechanism disposed at its other end (e.g., where the lighting fixture housing is the last housing in a line of housings).

Figure 3B:
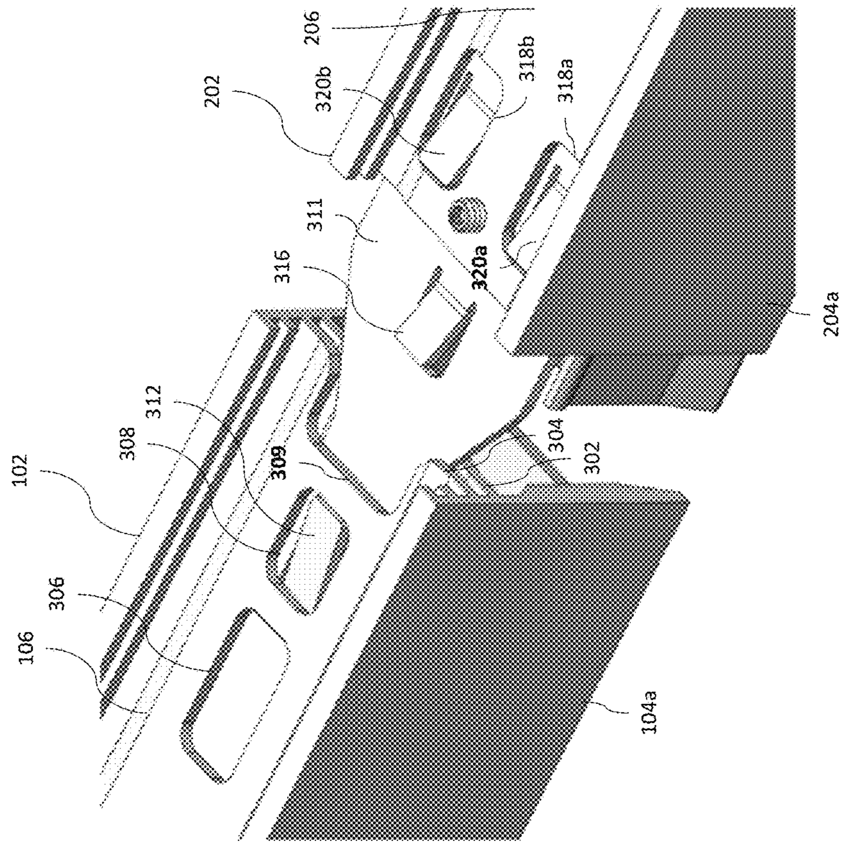
FIGS. 3*a-g* illustrate further details of the locking mechanism shown in FIG. 2, according to some implementations of the current subject matter.
Figure 3A:
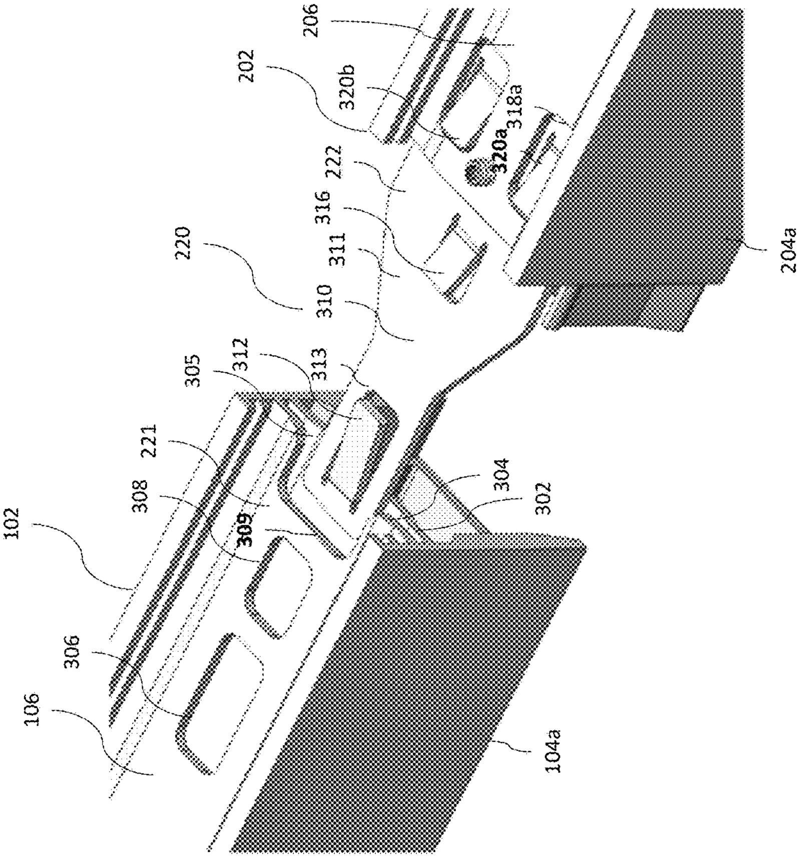
Figure 3C:
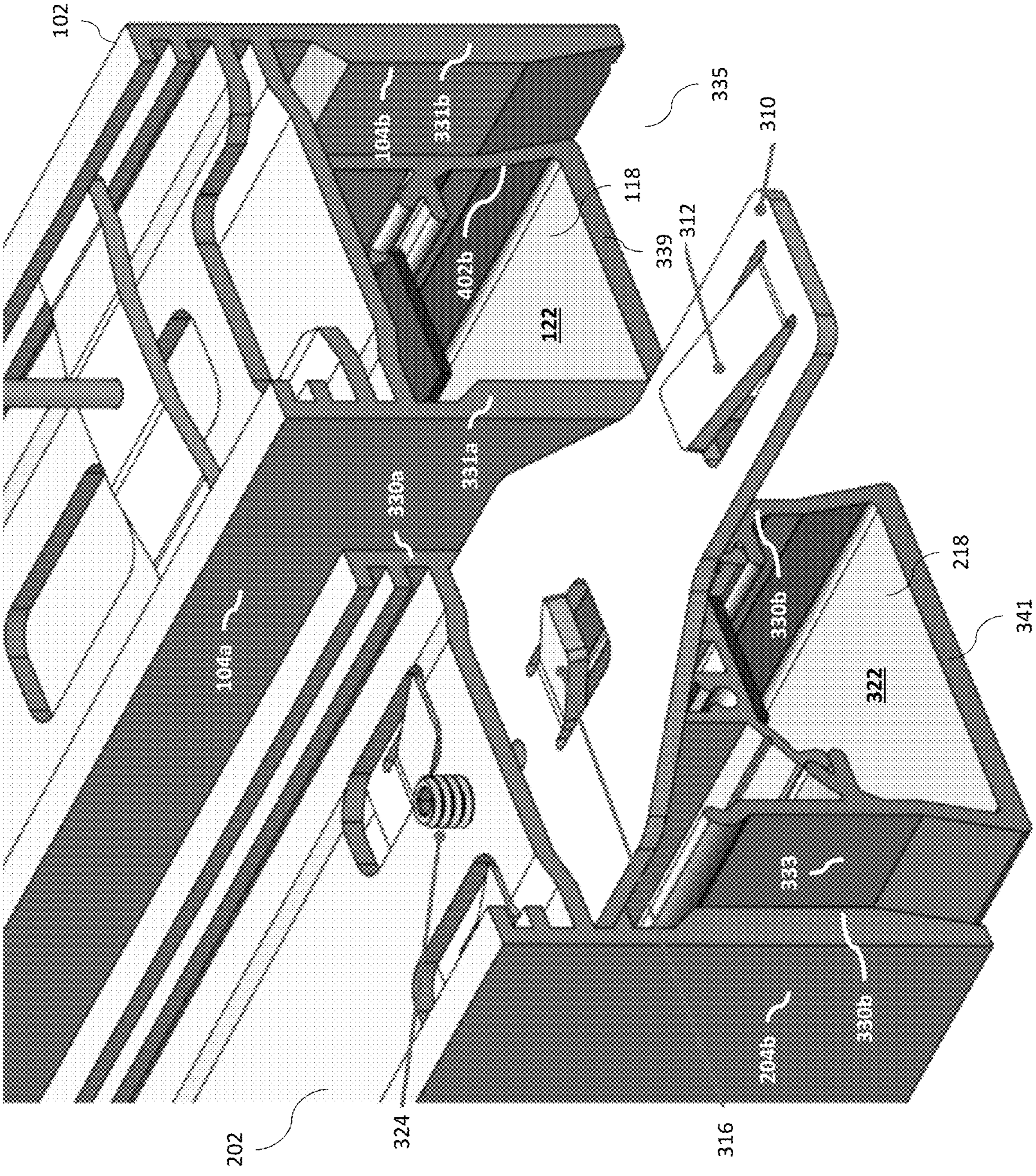
Figure 3D:
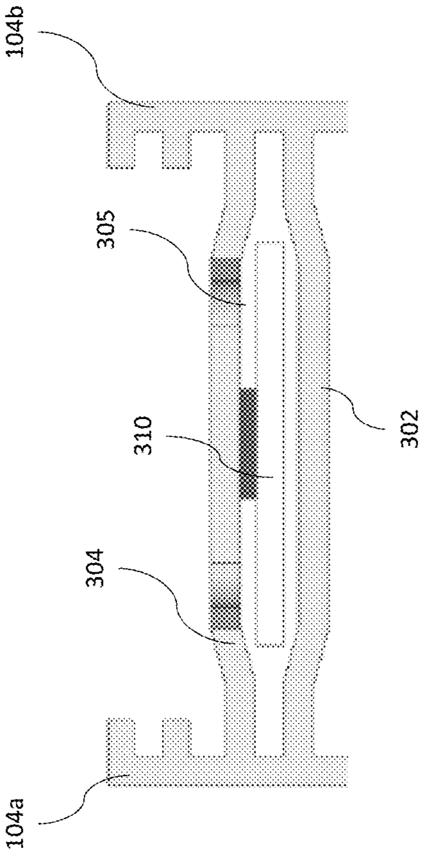
Figure 3F:
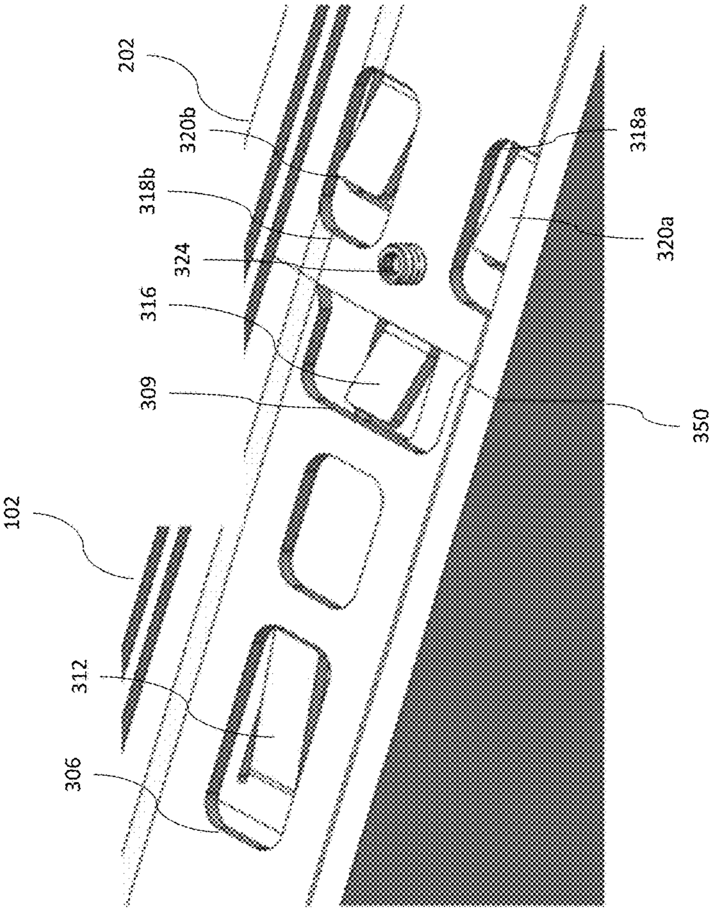

FIGS. 3*a-g* illustrate further details of the locking mechanism 221 shown in FIG. 2. The locking mechanism 221 may be configured to have an engaged state and a disengaged state. In the engaged state, the second portion 222 may fully be inserted into the first portion 220, as shown in FIG. 3*f*, thereby interlocking the portions 220 and 222 and hence, coupling the housings 102 and 202 together. In a disengaged state, as shown in FIG. 3*a*, the portions 220 and 222 may be separated.

As shown in FIGS. 3*a-d*, the first portion 220 may be formed in the top wall 106 of the housing 102. In some implementations, the first portion 220 may include a bottom plate 302 and a top plate 304. The top plate 304 and the bottom plate 302 may be spaced apart from one another, thereby forming a cavity 305 that may be sized to receive the second portion 222. The top plate 304 may face outwardly and away from the interior 108 of the housing 102. The bottom plate 302 may face inwardly into the interior 108 of the housing 102. The top plate 106 may include one or more openings 306, 308. The openings 306, 308 may interact with one or more tabs of the second portion 222 in the engaged state (as shown in FIG. 3*f*).

The second portion 222 may be slidably disposed between the bottom plate 312 and the top plate 314 of the top wall 206 of the housing 202 and may be configured to translate within the cavity 315 formed by the bottom plate 312 and top plate 314. The top plate 314 may include one or more openings 318*a* and 318*b*. The openings 318 may interact with one or more tensioned tabs of the second portion 222.

In some implementations, the second portion 222 may include a tongue 310 having a wide portion 311 and a narrow portion 313, where the wide portion 311 may be disposed proximate to the plates 312, 314 and the narrow portion 313 may be disposed distal to the plates 312, 314. The narrow portion 313 may be configured for insertion into the cavity 305 formed by the plates 302 and 304 of the housing 102 for interlocking of the housings 102 and 202.

The wide portion 311 may include a tensioned stop tab 316 and one or more tensioned retention tabs 320*a*, 320*b*. The tensioned retention tabs 320*a*, 320*b* may be directional retention tabs and may be configured to interact with the openings 318*a*, 318*b*, respectively, to prevent removal of the second portion 222 from the cavity 315 formed by the plates 312, 314 in the second portion 222. In particular, the retention tabs 320*a*, 320*b* may have an elevated position caused by tension in the tabs 320*a*, 320*b*, thereby preventing substantial removal of the second portion 222 from the cavity 315, and a stored position caused by application of pressure or force to the tabs 320*a*, 320*b* causing the tabs to bend, thereby allowing the second portion 222 to translate within cavity 315.

Upon pushing the second portion 222 into the cavity 315, the top plate 314 may be configured to cause the retention tabs 320*a*, 320*b* to bend in a downward direction away from the top plate 314 and toward the bottom plate 312 (as a result of pushing force being applied to the second portion 222), thereby having the tabs 320*a*, 320*b* assume the stored position. Upon pulling of the second portion 222 from the cavity 315 (e.g., for coupling with housing 102), the retention tabs 320*a*, 320*b* may, under tension, return to the elevated position (as shown in FIG. 3*b*) upon reaching the respective openings 318*a*, 318*b*. The area of the openings 318*a*, 318*b* may be larger than the area of the tabs 320*a*, 320*b* allowing the tabs to pop into the openings 318*a*, 318*b* in the elevated position. Once the tabs 320*a*, 320*b* are in the elevated position, further translation of the second portion 222 away from the cavity 315 may be prevented.

Moreover, the interaction of the tabs 320 and corresponding openings 318 may also serve as one of the alignment features that may assist in guiding and properly aligning of the housings 102 and 202 during their connection. Once the tabs 320 are positioned in the corresponding openings 318, the second portion 222 may be oriented in a particular direction for connection with the first portion 220 of the locking mechanism 221, thereby reducing rotational or other movement of the second portion 222, which may cause an incorrect alignment of the housings 102 and 202. As can be understood, while two tabs 320 and two corresponding openings 318 are shown, the current subject matter may include any number of tabs and/or openings.

The tensioned stop tab 316 may be disposed in the wide portion 311 of the second portion 222 and may be configured to interact with a recess portion 309 of the top plate 304 of the top wall 106 of the housing 102 during connection of the housings 102, 202 (as shown in FIG. 3*f*). The stop tab 316 may be configured to also prevent any further translational movement of the tongue 310 into the cavity 305 formed by the plates 302, 304 of the top wall 106 of the housing 102. The width of the stop tab 316 may be smaller than the width of the recess 309, thereby allowing the recess 309 to accommodate positioning of the stop 316 during connection of the housings 102, 202.

The narrow portion 313 may include a tensioned retention tab 312. The tensioned retention tab 312 may also be directional retention tab (similar to tabs 318) and may be configured to interact with the openings 308 and 306 to prevent removal of the second portion 222 from the cavity 305 formed by the plates 302, 304 in the first portion 220. The retention tab 312 may have an elevated position caused by tension in the tab 312, which may prevent removal of the second portion 222 from the cavity 305 once it is positioned in the cavity 305 and the opening 306 has engaged the retention tab 312. It may also have a bent position caused by application of pressure or force to the tab 312 causing the tab to bend, thereby allowing the second portion 222 to translate within cavity 305 (e.g., outside of openings 306, 308).

Figure 3E:
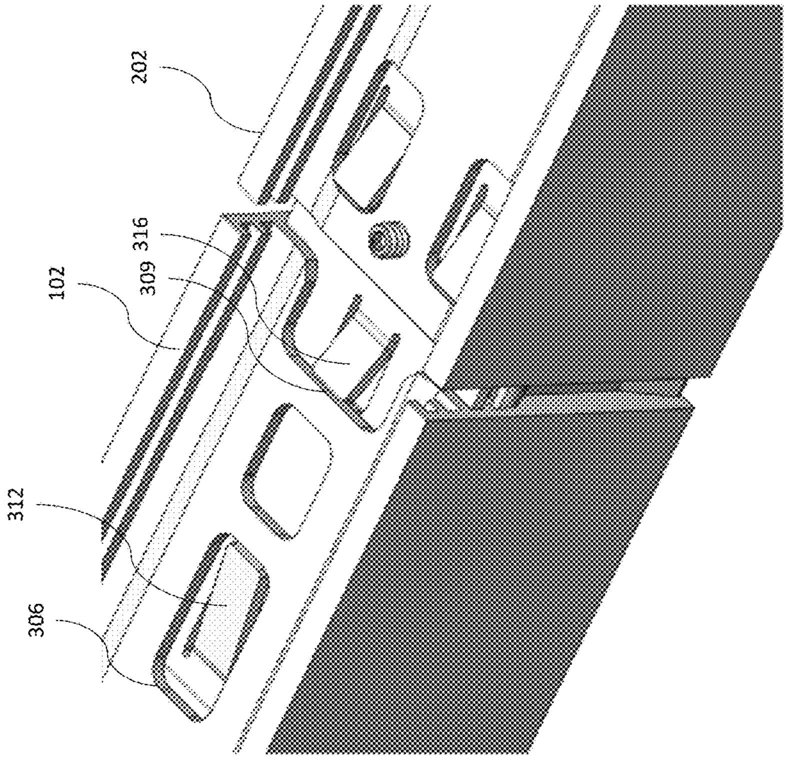

Upon pushing the second portion 222 into the cavity 305, the top plate 304 may be configured to cause the retention tab 312 to transition into the bent position by bending in a downward direction away from the top plate 304 and toward the bottom plate 302 (as a result of pushing force being applied to the second portion 222). Upon further pushing the second portion 222 into the cavity 305, the retention tab 312 may be configured to be engaged by the opening 308 and assume its elevated position, as shown in FIG. 3*b*. Even further pushing of the second portion 222 into the cavity 305, the top plate 304, and in particular, its portion between openings 306 and 308, may again cause the retention tab 312 to briefly transition into the bent position, which may be followed by the elevated position of the retention tab 312 once it is engaged by the opening 306, as shown in FIGS. 3*e-f*. The area of the openings 306, 308 may be larger than the area of the tab 312 allowing the tab to pop into the opening 306 and then into the opening 308 in its elevated position.

Upon being engaged by the opening 306, the retention tab 312 may prevent second portion 222 from being pulled away from the interior cavity 305 of the housing 102. This, along with tabs 320*a*, 320*b* may retain the housings 102 and 202 in a connected state, as shown in FIG. 3*e*. Retention of the housings 102 and 202 in the connected state may be afforded by the tab 312 preventing translation of the second portion 222 in one direction and tabs 320*a*, 320*b* preventing translation of the second portion 222 in an opposite direction. Further, the tabs 312 and 320 (*a, b*) by engaging in respective openings 308 and 318 (*a, b*) may assist in aligning the housings 102 and 202 in the same direction.

To remove the second portion 222 from the cavity 305 of the housing 102, the tab 312 may be pushed in a downward direction (i.e., toward the interior 108 of the housing 102), so that the opening 306 no longer engages the tab 312, and the housing 202, along with second portion 222, may be pulled away from the cavity 305. While pulling the housing 202, the tab 312 may be engaged by the opening 308 (as shown in FIG. 3*b*). To disengage the tab 312, form the opening 308, the tab 312 may again be pushed in the downward direction, so that the opening 308 no longer engages the tab 312. At this point, the housing 202 may be completely disengaged from the housing 102.

Figure 3G:
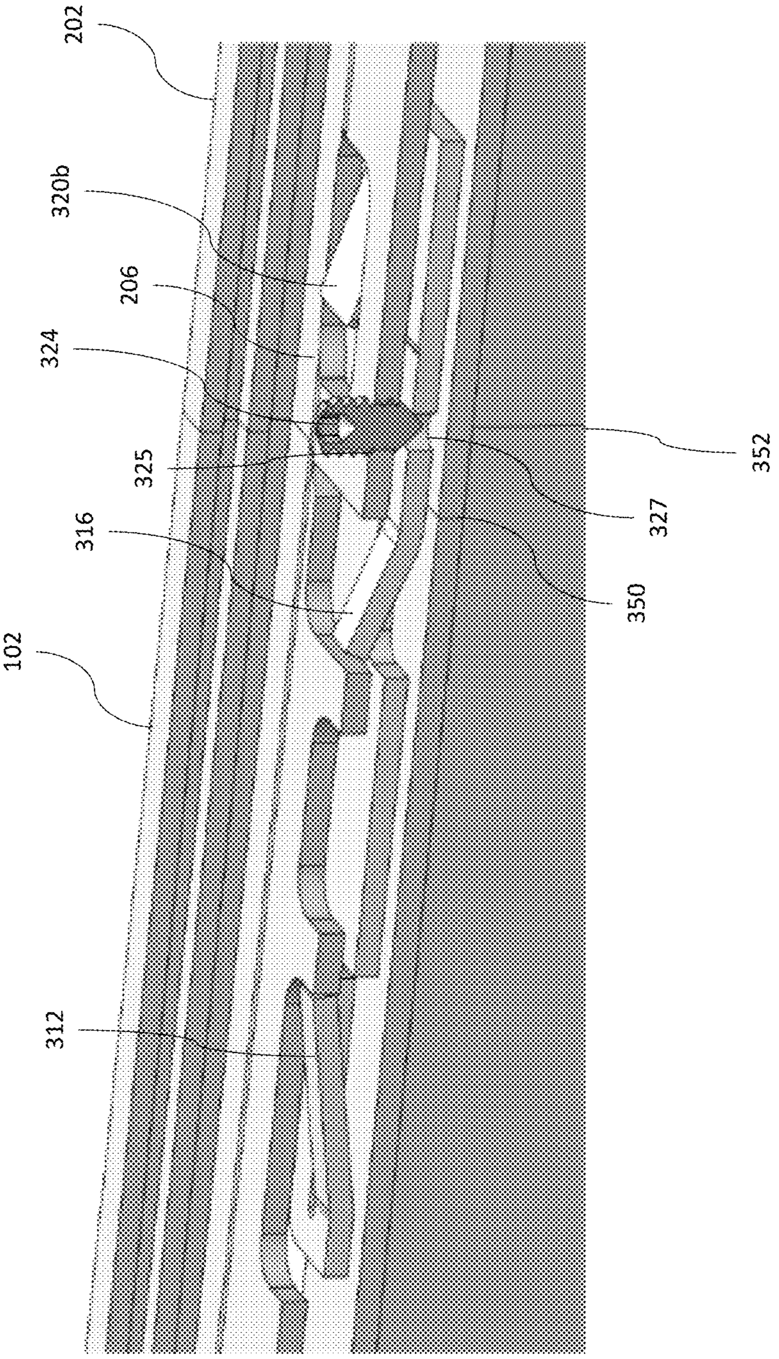

In some implementations, once the housings 102 and 202 are connected with tabs 312 and 320 (*a, b*) are engaged by their respective openings 306, 318 (*a, b*) and stop tab 316 is positioned in the recess 309, a screw 324 may be used to further secure the tongue 310, as shown in FIGS. 3*f-g*. In an engaged state of the screw 324, the screw 324 may protrude through an opening 325 of the top plate 314 of the top wall 206 of the housing 202 and into an opening 327 in the tongue 310. The opening 327 may be configured to be positioned between tab 316 and tabs 320 (*a, b*), as shown in FIG. 3*g*. Upon tightening (e.g., by rotating it in a clockwise direction) of the screw 324, the screw 324 may secure the tongue 310 and prevent its movement in any direction.

To release the tongue 310, the screw 324 may be loosened (e.g., by rotating it in a counterclockwise direction) until it is no longer engaged by the opening 327. Once released, the tab 312 may be pressed to release it from openings 306, 308, as described above, and the tongue 310 may be removed from the cavity 305. Alternatively, or in addition, the screw 324 may remain engaged by the opening 327, and instead of moving the tongue 310, the tab 312 may be pressed down and the housing 102 may be removed by translating it along the tongue 310 away from the housing 202. As can be understood, the screw 324 may be an optional securing feature in addition to the tabs 312, 316, and 320 (*a, b*).

In some implementations, use of the above connection features (e.g., tongue 310, tabs 312, 316, 320 (*a, b*), openings 306, 308, 312 (*a, b*), screw 324, etc.) may allow for an easy changing/removal/servicing/replacement of lighting fixture housings. The connection features may be easily disengaged, thereby allowing one housing to be disengaged from another housing. Once the housing has been serviced/replaced, either the same housing or a new housing may be connected to the housing that is already in place using its connection features and the connection features of the existing housing. The arrangement and operation of connection features of the current subject matter's lighting fixtures may be beneficial in a variety of ways. For example, the current subject matter's connection features may reduce labor and failure modes during installation. In contrast, existing lighting fixtures typically require more precise alignment and may need to be joined tightly. This is inferior to the current subject matter's lighting fixtures having the above connection features that greatly reduce the level of precision that is required to form an initial connection between lighting fixture housings and simplify tightening of fixtures once the initial connections is formed.

Figure 4A:
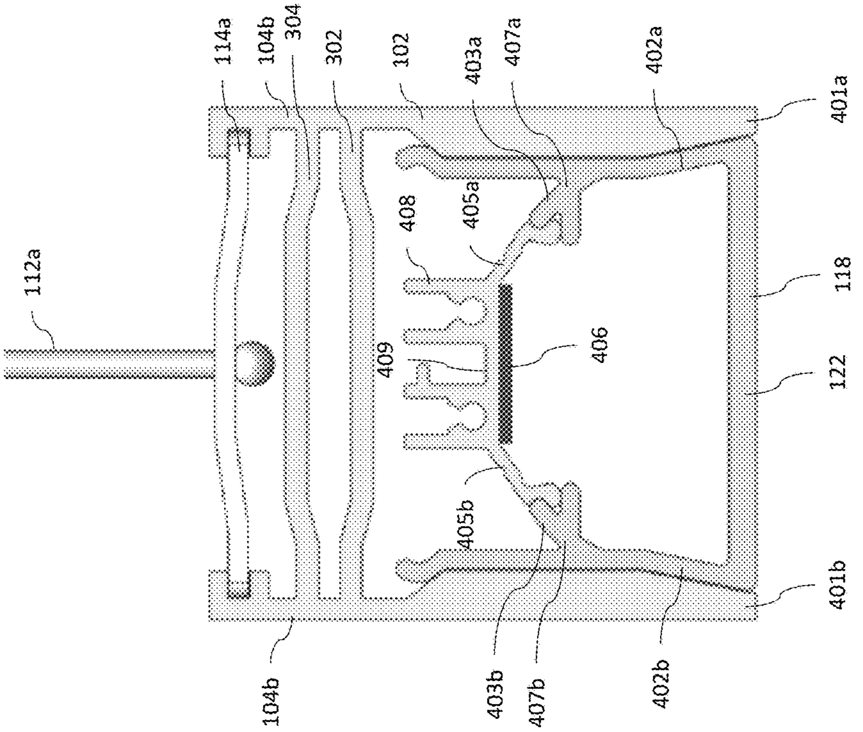
FIGS. 4*a-b* are cross-sectional views of the lighting fixture housing, according to some implementations of the current subject matter.
Figure 4B:
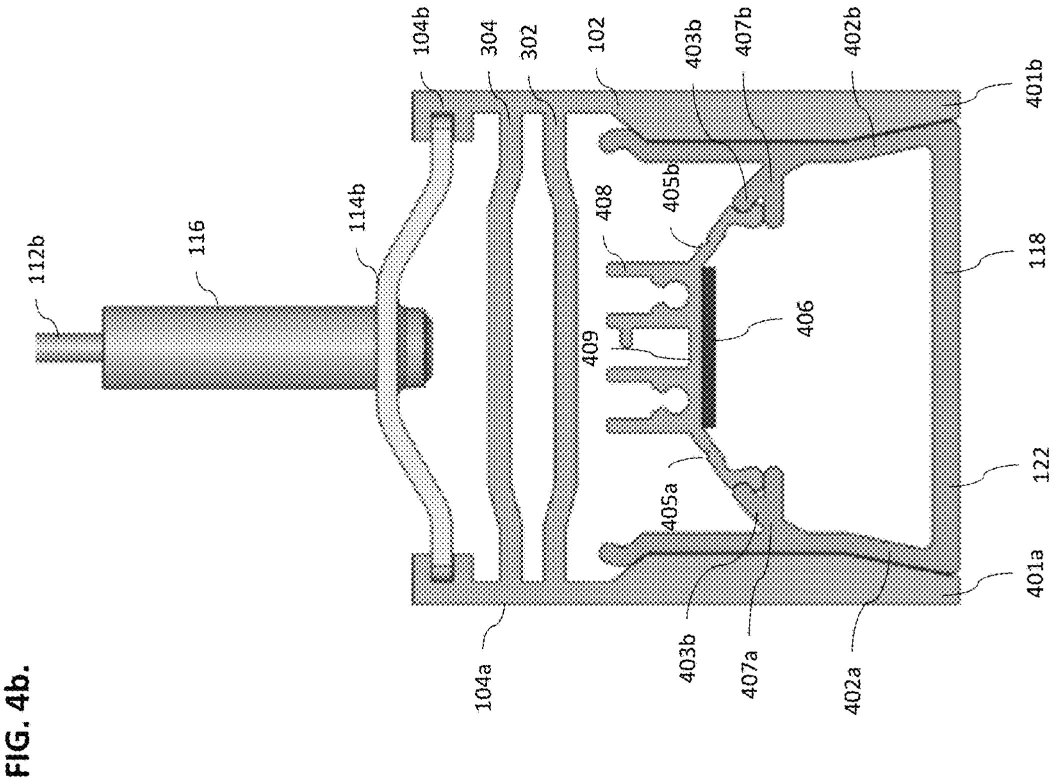

FIGS. 4*a-b* are cross-sectional views of the lighting fixture housing 102, according to some implementations of the current subject matter. As shown in FIGS. 4*a-b*, the lighting fixture housing 102 may be configured to releasably secure the lighting lens housing 118. The lighting lens housing 118 may include a first lens sidewall 402*a*, a second lens sidewall 402*b*, and the lighting lens 122 disposed between the first and second lens sidewalls 402*a*, 402*b*. Releasable securing of the lighting lens housing 118 within housing 102 may be accomplished by snap-fitting the lighting lens housing 118 in the interior of housing 102. In some example implementations, the first and second lens sidewalls 402*a*, 402*b* may have portions that may be curved and/or have a bent structure that may substantially match curvature and/or bends of interior portions of housing sidewalls 104*a*, 104*b*, respectively, so as to snap-fit the lighting lens housing 118 into within the housing 102. Upon the lighting lens housing 118 being positioned in the interior of the housing 102, the sidewalls 402 (*a, b*) may be configured to be adjacent and/or be positioned against respective interior surfaces of the sidewalls 104 (*a, b*) (i.e., sidewall 402*a* is adjacent/positioned against interior surface of sidewall 104*a*; sidewall 402*b* is adjacent/positioned against interior surface of sidewall 104*b*). As can be understood, other ways of positioning and/or securing of the lighting lens housing 118 within the interior of the housing 102 are possible.

Upon positioning of the lighting lens housing 118 within the interior of the housing 102, the lighting lens 122 may be configured to be positioned flush within the distal ends of 401*a*, 401*b* of the respective sidewalls 104*a*, 104*b*, as shown in FIGS. 4*a-b*. As will be discussed in connection with FIG. 7*e*, other ways of positioning of lighting lens housings are possible.

The lens sidewalls 402*a*, 402*b* of the lighting lens housing 118 may include liner support projections 407*a*, 407*b*, respectively. The projections 407*a*, 407*b* may protrude from interior surfaces of the sidewalls 402*a*, 402*b*, respectively, into the interior space of the lighting lens housing 118. Each projection 407*a*, 407*b* may include respective tensioned forks 403*a*, 403*b*. The tensioned forks 403*a*, 403*b* may support a lighting liner 408 that may hold a lighting element (e.g., LED) 406. The lighting liner 408 may include support arms 405*a*, 405*b* that may be integral with and extend outwardly from a lighting element support platform 409. Distal ends of the support arms 405*a*, 405*b* may be releasably secured (such as, for example, but not limited to a snap-fit) within the respective tensioned forks 403*a*, 403*b* to suspend the liner 408 within the interior space of the lighting lens housing 118, as shown in FIGS. 4*a-b*.

In some implementations, the projections 407*a*, 407*b* may be disposed throughout the entire length of the lighting lens housing 118. For example, each projection 407 may be as long as the lighting lens housing 118. Alternatively, or in addition, multiple projections 407 may be distributed along the length of each respective lens sidewall of the lighting lens housing 118. Similarly, the liner 408 may likewise be disposed throughout the entire length of the lighting lens housing 118 (e.g., the liner 408 may be as long as the length of the lighting lens housing 118). Alternatively, or in addition, multiple liners 408 may be disposed throughout the length of the lighting lens housing and at locations corresponding to the locations of corresponding projections 407. The lighting elements 406 may also be disposed throughout the entire length of the housing 118, either as serially connected elements (e.g., on an adhesive tape that may be attached to the liner 408) and/or as individual elements.

By suspending the liner 408 within the interior space of the lighting lens housing 118, the lighting element 406 may likewise be suspended above the lighting lens 122 with the lighting element 406 projecting light (as generated by it) toward the lighting lens 122. The lighting lens 122, by virtue of its at least partial transparency to light, may diffuse the generated light posterior to the lighting lens housing 118 and into the exterior space (e.g., exterior to the housing 102).

In some implementations, depending on a desired use of the lighting fixture system, the liner 408 may be suspended in various ways within the lighting lens housing 118. This may be accomplished through altering structure of elements that support the liner 408. FIGS. 7*a*-7*e* illustrate various example implementations of the structural support elements for the liner 408 and resulting corresponding light disseminations.

Figure 7A:
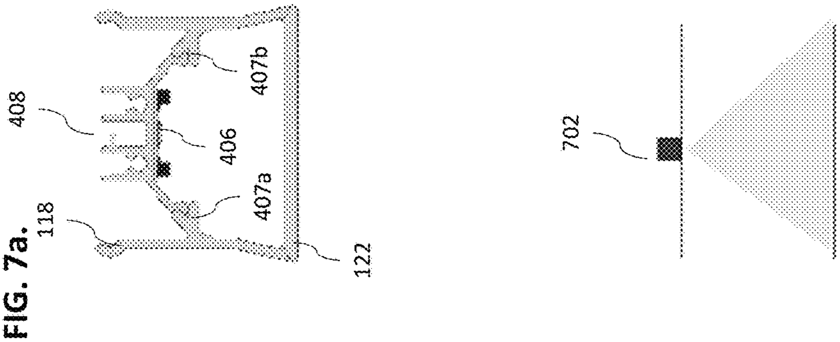
FIGS. 7*a-e* illustrate various example implementations of the structural support elements for a liner and resulting corresponding light disseminations, according to some implementations of the current subject matter.

FIG. 7*a* illustrates an arrangement of the liner 408 similar to the one shown in FIGS. 4*a-b*. This arrangement may be referred to, for example, as a high efficiency arrangement that may project light generated by the lighting element 406 in substantially equally-distributed light volume from the lighting fixture. This is illustrated by distribution of light 702.

Figure 7B:
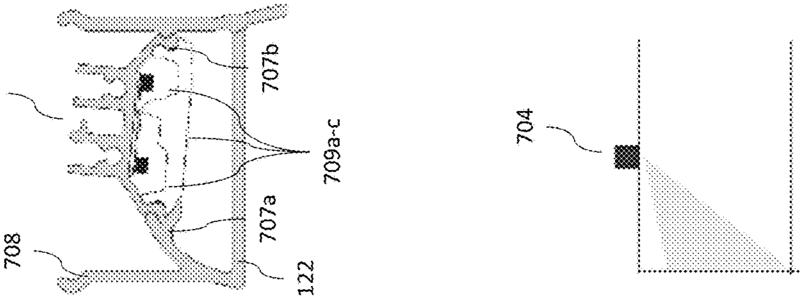

FIG. 7*b* illustrates an example lighting lens housing 708, according to some implementations of the current subject matter. The lighting lens housing 708 may include support projections 707*a* and 707*b* that support the liner 408. As shown in FIG. 7*b*, the support projection 707*a* may be longer than projection 707*b* and thus, may extend further into the interior of the lighting lens housing 708 than the projection 707*b*. This allows positioning of the liner 408 at an angle with respect to the lighting lens 122. Such positioning may allow focusing distribution of light in an angular fashion (e.g., to illuminate a wall, a painting, etc.), as shown by the distribution of light 704. In some example, non-limiting implementations, the lighting element(s) 406 may be fitted with one or more focusing lenses 709 (*a, b, c*), which may assist in focusing how the light generated by the lighting element(s) 406 is diffused through the lighting lens 122.

Figure 7C:
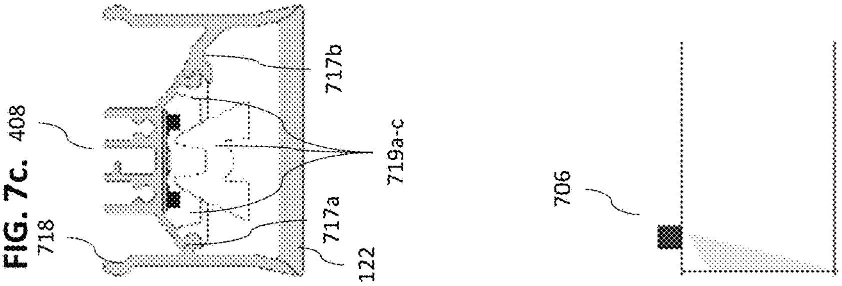

FIG. 7*c* illustrates an example lighting lens housing 718, according to some implementations of the current subject matter. The lighting lens housing 718 may include support projections 717*a* and 717*b* for supporting the liner 408. As shown in FIG. 7*c*, the support projection 717*a* may be shorter than projection 717*b* allowing support projection 717*b* to extend further into the interior of the lighting lens housing 718 than the projection 717*a*. This allows positioning of the liner 408 closer to one of the lens sidewalls (e.g., sidewall 714*a*) and further away the other sidewall (e.g., sidewall 714*b*) rather than an angle with respect to the lighting lens 122 (as shown in FIG. 7*b*). Such positioning of the liner 408 may allow focusing distribution of light in at a shaper angle (e.g., to illuminate a focused portion of a wall etc.), as shown by the distribution of light 706. Similar to FIG. 7*a*, the lighting element(s) 406 may also be fitted with one or more focusing lenses 719 (*a, b, c*), which may further focus light distribution.

Figure 7D:
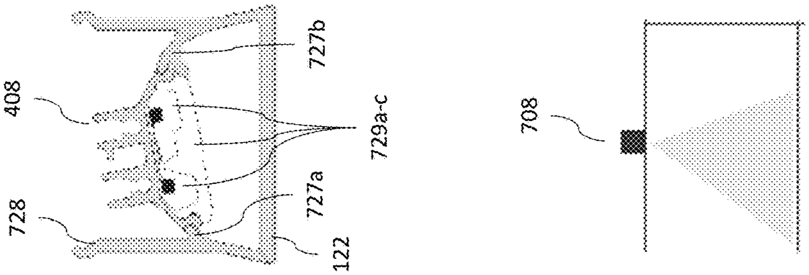

FIG. 7*d* illustrates an example lighting lens housing 728, according to some implementations of the current subject matter. Similar to the lighting lens housing 708 shown in FIG. 7*b*, the lighting lens housing 728 may include support projections 727*a* and 727*b* that support the liner 408. However, as shown in FIG. 7*d*, the support projection 727*b* may be longer than projection 727*a*, thereby extending further into the interior of the lighting lens housing 708. This allows positioning of the liner 408 at an angle with respect to the lighting lens 122 and allowing for an asymmetric distribution of light through the lighting lens 122, as shown by the distribution of light 708. Again, in some example, non-limiting implementations, the lighting element(s) 406 may be fitted with one or more focusing lenses 729 (*a, b, c*) to further focus distribution of light.

Figure 7E:
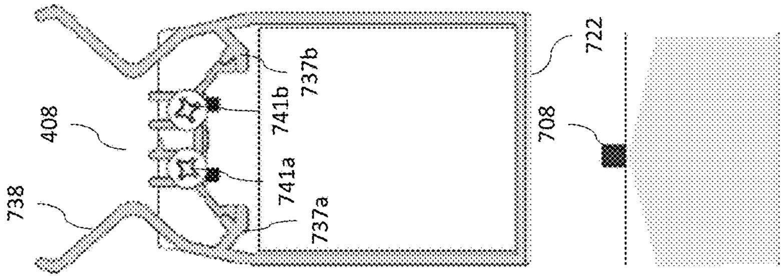

FIG. 7*e* illustrates an example lighting lens housing 738, according to some implementations of the current subject matter. While the positioning of the liner 408 in the interior of the housing 738 may be similar to the positioning of the liner 408 shown in FIG. 7*a* (e.g., using substantially equally protruding arms 737*a*, 737*b*), the housing 738 may be fitted with a drop lighting lens 722 that may extend further away from the lighting fixture housing (not shown in FIG. 7*e*) and provide a substantially full (e.g., 270-360 degrees) distribution of light, as shown by the distribution of light 710. The drop lighting lens 722 may be coupled to the liner 408 using one or more fasteners (e.g., screws, rivets, etc.) 741*a*, 741*b*.

Figure 8B:
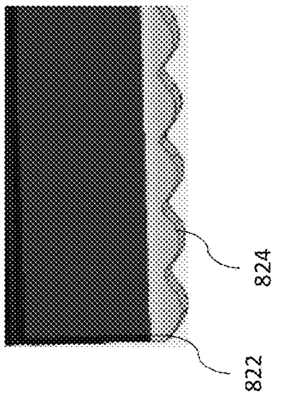
FIGS. 8*a-b* illustrate portions of an example lighting lens housing that may include such refractive features, according to some implementations of the current subject matter.
Figure 8A:
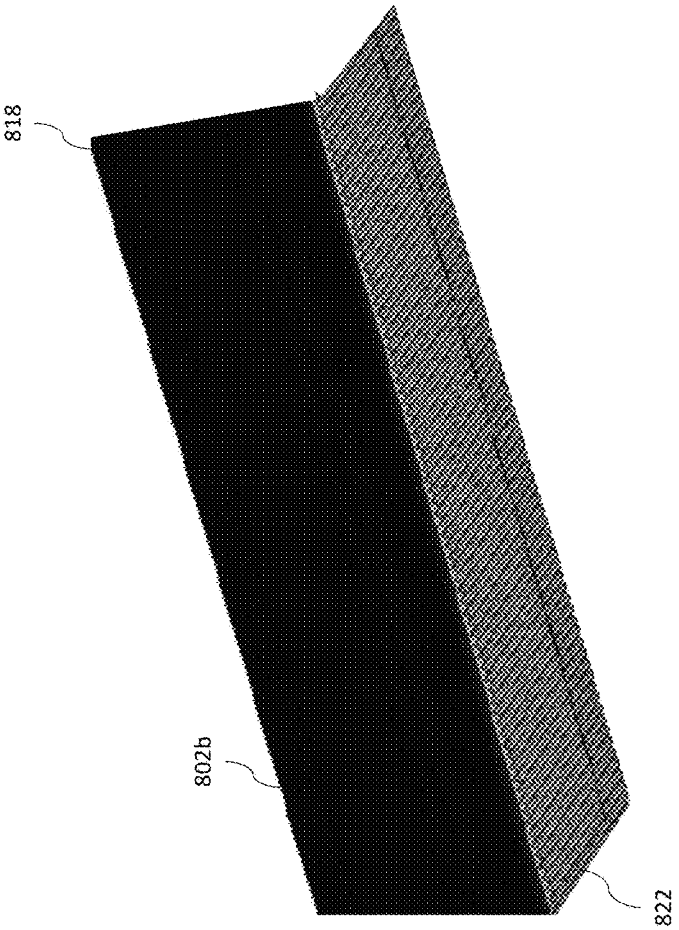

In some implementations, to provide a more uniform distribution of light, the lighting lens may include one or more refractive features. FIGS. 8*a*-*b* illustrate portions of an example lighting lens housing 818 (which may be similar to the lighting lens housing 118 shown in FIGS. 1-2*b*) that may include such refractive features, according to some implementations of the current subject matter. The lighting lens housing 818 may include lens sidewalls 802 (*a, b*) (only sidewall 802*b* is shown for ease of illustration) and a lighting lens 822. The lighting lens 822 may include one or more refractive features 824 (as shown in FIG. 8*b*). The refractive features 824 may aid in more uniform diffusion of light produced by a lighting element or engine (not shown in FIGS. 8*a*-*b*). They may also reduce glare and any unwanted reflections. As can be understood, the features 824 may be any other type of elements, e.g., polarization elements, light filtering elements, light blocking elements, light grating elements, etc. and/or any combination thereof. While FIGS. 8*a*-*b* illustrate features 824 being uniformly spaced throughout an exterior surface of the lighting lens 822 in a wave-like fashion, the features 824 may be arranged in any desired way and may depend on a specific application of the lighting fixture and desired/preferred illumination.

Moreover, lighting lens housing 818 (as well as lighting lens housing 118) may include lens sidewalls 822 that may be light-filtering, light blocking, and/or light-opaque to prevent light generated by the light element/engine from escaping through the sidewalls. This may prevent unwanted reflections, glare and/or any other undesired effects when lighting fixture housings are coupled together and installed in a particular space.

Referring back to FIGS. 3*a*-*f*, the lighting lens housing 118 may be positioned within the housing 102 (and/or housing 202) at an offset. For example, as shown in FIG. 3*c*, the lighting lens housing 218 may extend beyond the edges or ends 330*a*, 330*b* of sidewalls 204*a*, 204*b*, respectively, of the housing 202, thereby creating an exterior offset 333. Similarly, the housing 102 may extend beyond edges or ends 331*a*, 331*b* of sidewalls 402*a*, 402*b*, respectively, of the lighting lens housing 118, also creating an interior offset 335. The lengths of the created offsets may be equal and/or substantially equal to allow interior offset(s) 335 to match exterior offset(s) 333 of lighting fixtures upon connection two their respective housings (e.g., connection of housing 102 and housing 202). Moreover, as shown in FIG. 3*c*, the lighting lens panel 122 may include a first end 339, which as a result of the positioning of the lighting lens housing 118, may be positioned at an offset with respect to the ends 331*a*, 331*b* of the housing 102. The lighting lens panel 122 may also include a second end (which may be similar to the end 341 of the lighting lens 322) that may likewise be positioned at an offset and extend beyond the ends of the housing (e.g., as shown in FIG. 3*c*, the end 341 of the lighting lens 322 extends beyond the housing's ends 330*a*, 330*b*). It should be noted that the positioning/securing of the lighting lens housing in/to the housing may cause the lighting lens (along with lens sidewalls) to extend beyond the ends of the housing at one end of the lighting lens/housing (e.g., lens 322 extending beyond the ends of the housing 202) while the housings' ends extending beyond the end of the lighting lens (e.g., ends of housing 102 extending beyond the end of the lighting lens 122). In some alternate, example implementations, the lighting lens housing (including the lighting lens and the lens sidewalls) may extend beyond ends of the housing at its both ends. In further alternate, example implementations, the housing may extend beyond ends of the lighting lens housing at its both ends.

Further, in some implementations, upon connection of two housings, e.g., housings 102 and 202, as shown in FIG. 2, with lighting lens housings positioned therein, e.g., housings 118 and 218, respectively, as shown in FIG. 3*c*, the housings and the lighting lens housings may form respective seams. For example, as shown in FIGS. 3*f* and 3*g*, the housings 102 and 202 may form a housing connection joint or seam (terms used interchangeably herewith) 350. Similarly, the lighting lens housings 118 and 218 may form a lighting lens housing connection joint or seam 352. As shown in FIG. 3*g*, the housing connection joint 350 may be positioned at an offset, as discussed herein, with respect to the lighting lens housing connection joint 352 (or vice versa). Such respective joining of the housing sidewalls and the lighting lens housing sidewalls as well as opaqueness or non-transparency of the lighting lens housing sidewalls may prevent transmission (or escape) of light through the joint 350 of the housing sidewalls.

Figure 6:
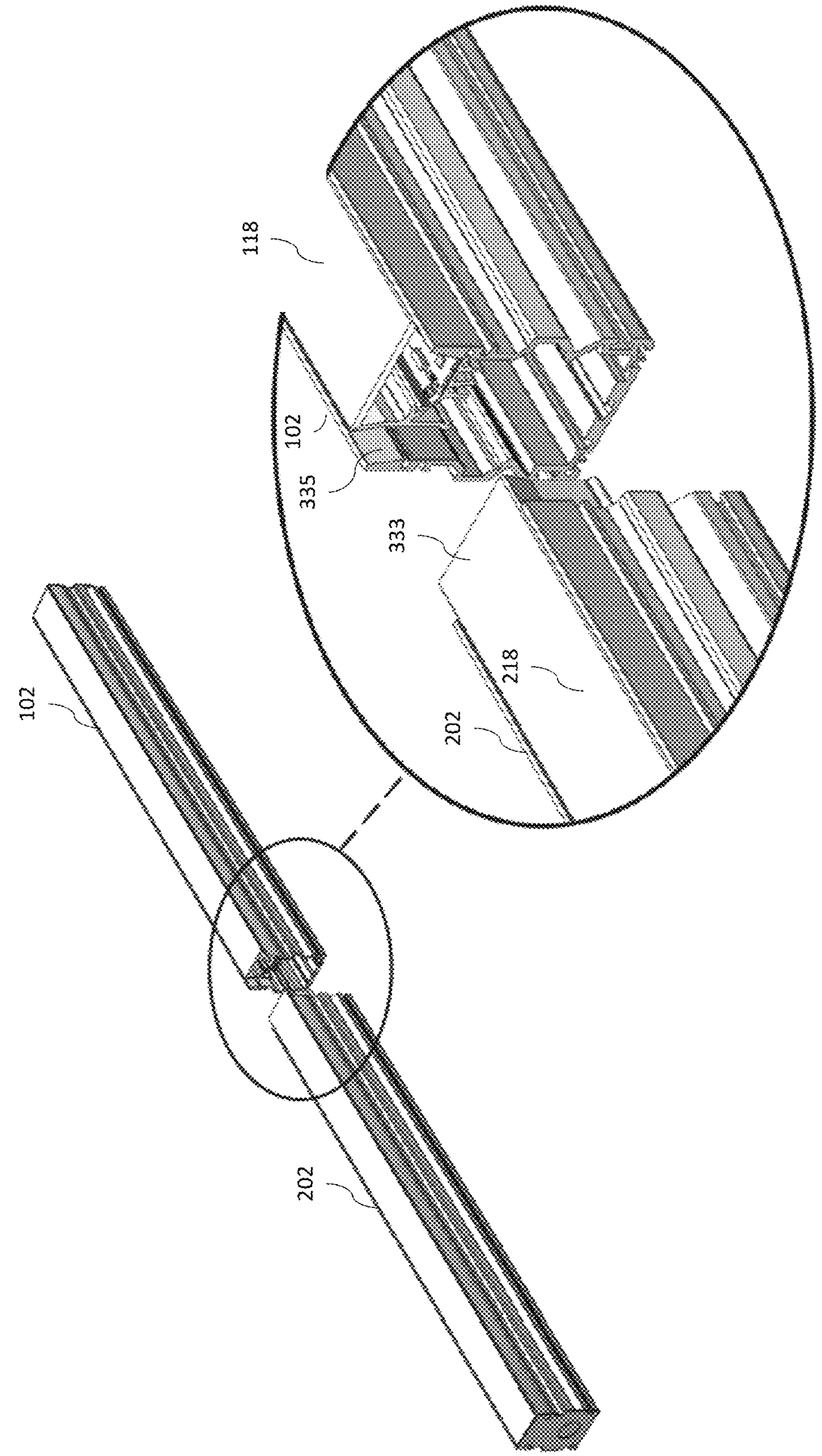
FIG. 6 illustrates an example connection of housings with the use of interior and exterior offsets, according to some implementations of the current subject matter.

FIG. 6 illustrates an example connection of housings 102 and 202 with the use of interior and exterior offsets 335, 333. As shown, the exterior offset 333 of the lighting lens housing 218 that extends beyond the edges or ends 330*a*, 330*b* of sidewalls 204*a*, 204*b*, respectively, of the housing 202 may be aligned with the interior offset 335 created by the lighting lens housing 118 when connecting the housings 102 and 202.

In some implementations, as shown in FIGS. 8*a-b*, the lighting lens housing's sidewalls may be light-filtering, light blocking, and/or light-opaque. Thus, use of the interior and/or exterior offsets 335, 333 in addition to the light-filtering, light blocking, and/or light-opaque nature of the lighting lens housing's sidewalls may enhance an ability to block and/or prevent escape of light as well as reduce unwanted glare, reflections and/or other undesired side effects from joints formed by connection of two housings (e.g., housings 102, 202).

FIGS. 5*a-f* illustrate an example assembly and/or installation process for positioning of a lighting lens housing (e.g., housing 118) within the lighting fixture housing (e.g., housing 102), according to some implementations of the current subject matter. As can be understood, the order of FIGS. 5*a-f* does not imply a particular order of assembly/installation.

Figure 5A:
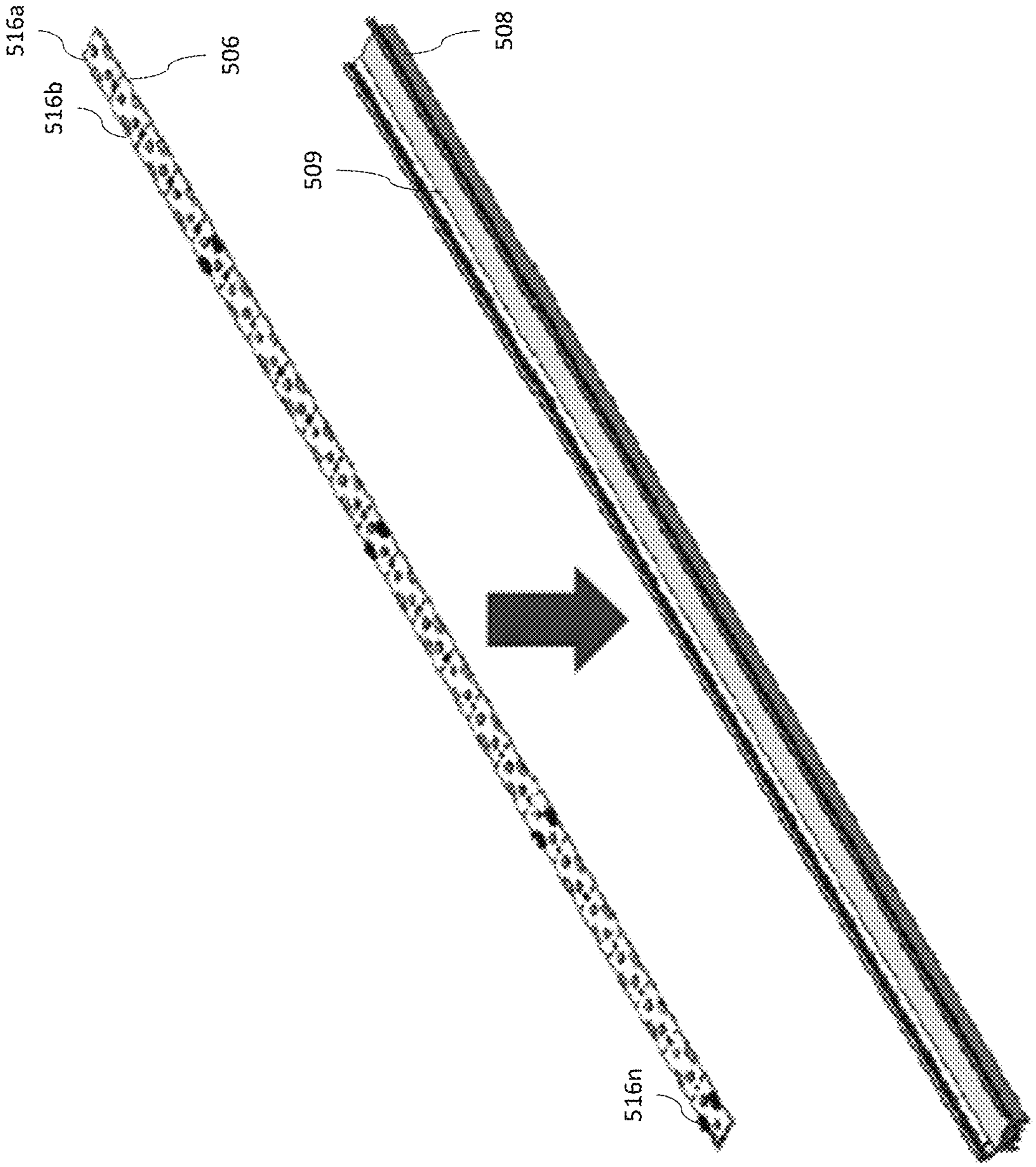
FIGS. 5*a-f* illustrate an example assembly and/or installation process for positioning of a lighting lens housing within the lighting fixture housing, according to some implementations of the current subject matter.

As shown in FIG. 5*a*, a lighting element 506 (similar to lighting element 406 shown in FIGS. 4*a-b*) may be coupled to a platform 509 (similar to platform 409) of the liner 508 (similar to liner 408) of lighting lens housing (as shown by the arrow in FIG. 5*a*). By way of a non-limiting example, the lighting element 506 may include an adhesive and/or any other attachment means that may be used to attach the lighting element 506 to the platform 509. In some implementations, the lighting element 506 may also include one or more lighting sections 516 (a, b, . . . , n), where each lighting section 516 may include individual light producing components 518 (e.g., LEDs) (as shown in FIG. 5*b*). The length of the lighting element may be adjusted to fit a particular lighting lens housing. This may be accomplished by removing one or more sections 516 from the lighting element 506. Alternatively, or in addition, sections 516 may be separately installed as individual lighting elements. Further, in some implementations, each lighting section 516 may be electrically coupled to a source of electrical power. Alternatively, or in addition, a single lighting section 516 in the lighting element 506 may be electrically coupled to the source of electrical power, and electrically connected to other lighting sections 516 in the lighting element 506 to provide electrical power to them. Such connections may be in-series and/or in-parallel.

Figure 5C:
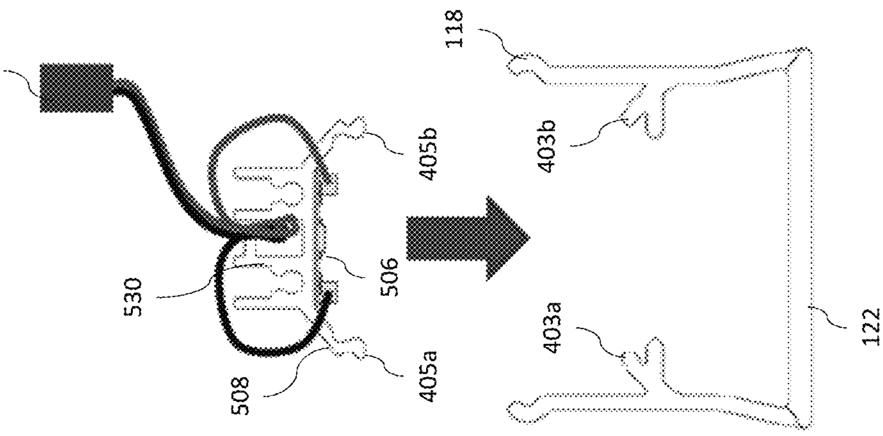
Figure 5B:
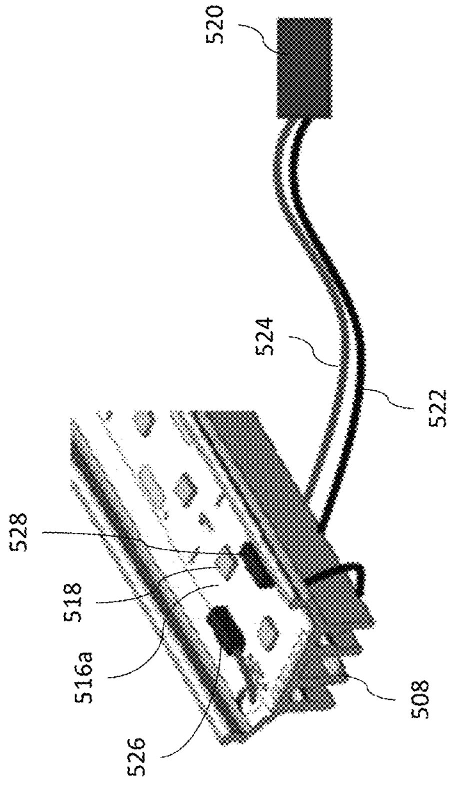
Figure 5D:
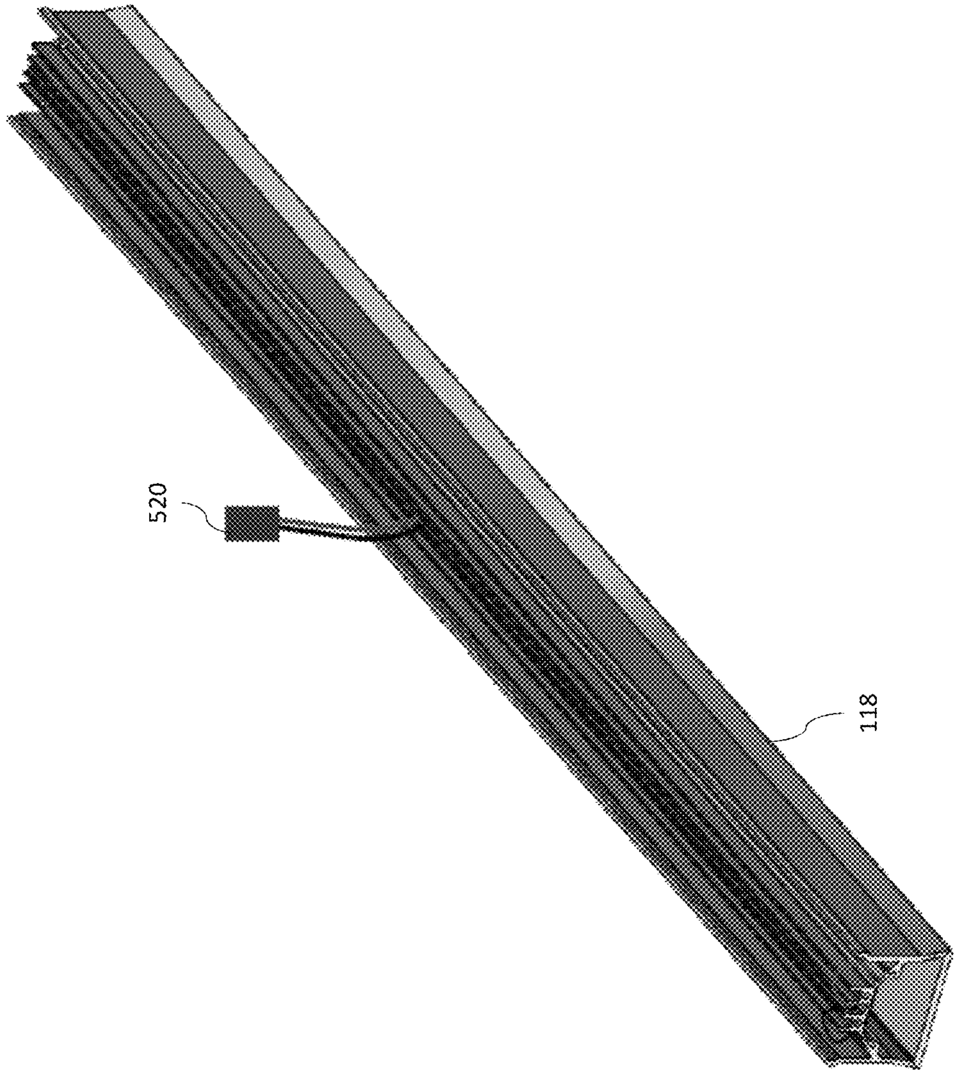

Referring to FIGS. 5*b-d*, the lighting element 506 may be electrically coupled to an electrical connector 520 that may, in turn, be electrically connected to a source of electrical power (not shown in FIGS. 5*b-c*). The electrical connector 520 may include wires 522 and 524, which may be electrically coupled to lighting element connectors 528, 526, respectively. The lighting element connectors 526, 528 may be positioned on at least one section 516 and may be electrically connected to the light producing components 518. The wires 522, 524 may be routed through the liner's wiring harness 530, as shown in FIG. 5*c-d.*

The lighting element 506 along with wires 522, 524 positioned in the wiring harness 530 may be releasably secured within the lighting lens housing 118, as shown by the arrow in FIG. 5*c-d.* The electrical connector 520 may be extended from the lighting lens housing 118 at any desired location. As shown, for example, in FIG. 5*d*, the electrical connector 520 may be extended from the lighting lens housing 118 in the middle of the housing 118, which may be proximate to an electrical connector 532 in the housing 102 (as shown in FIG. 5*e*) that may be used to electrically connect the electrical connector 520 to the source of electrical power. A ground wire 534 may also be connected to the lighting element 506 (as shown in FIG. 5*e*).

Figure 5F:
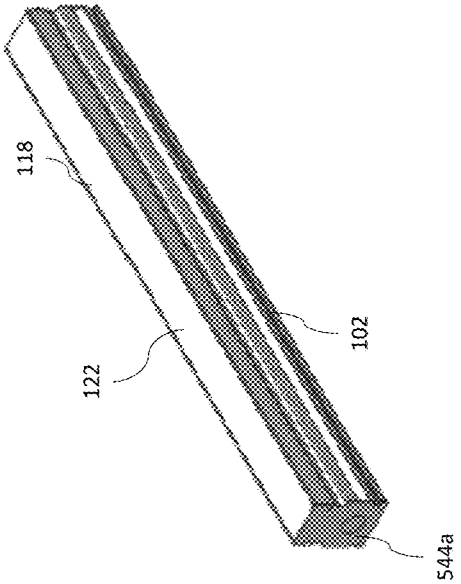
Figure 5E:
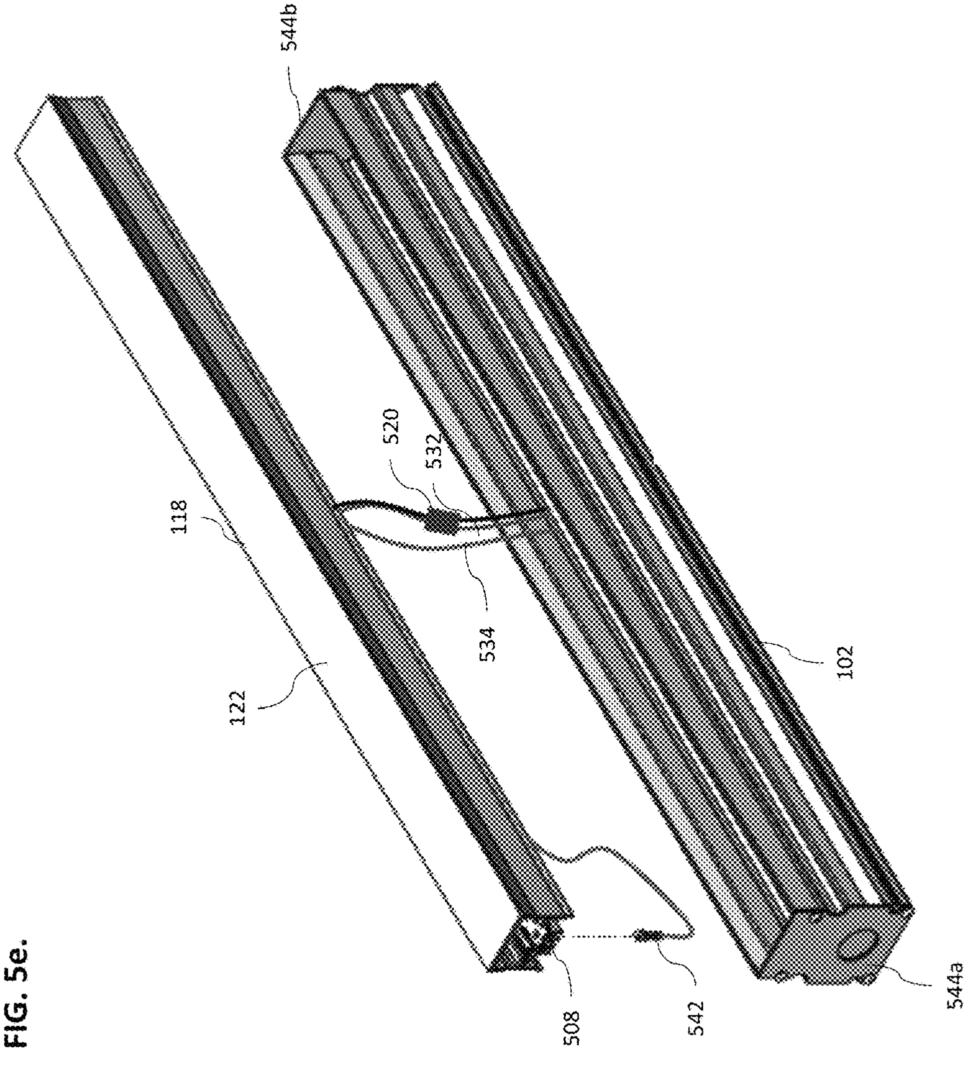

Referring to FIGS. 5*e-f*, in some implementations, an optional service string 542 may be coupled to the liner 508. The service string 542 may be used to pull the liner 508 from the lighting lens housing 118. This may be done when repair, replacement, and/or servicing of the components of the lighting lens housing 118, e.g., lighting element 506, etc., may be needed.

Once electrical connections are made, the lighting lens housing 118 may be positioned into the lighting fixture housing 102, as shown in FIG. 5*f*. In some implementations, if the lighting fixture housing 102 may include end caps 544*a* and 544*b* that may be positioned at ends of the lighting fixture housing 102. The end caps 544 may be used to enclose the interior of the lighting fixture housing 102 thereby preventing escape of unwanted light, reflections, etc. as well as collection of dust, moisture, etc. in the interior of the lighting fixture housing 102. When multiple lighting fixture housings are connected together to form a line of lighting fixture housings, the end caps 544 may be used to cap off start and end of such line. In this case, the caps 544 would typically not be positioned between lighting fixture housings.

In some implementations, the above construction of the lighting fixture system may provide a lighting fixture with length-adjustable housing and optical electrical assembly. In particular, the current subject matter's modular optical electrical assembly construction may include a common LED and a heatsink that when coupled with a primary optic and/or lens may change the light output characteristics. This design may enable interchangeability of the optic and lens by end users with keyed features in the profile to prevent possibility of incorrect assembly. This is in contrast to convention lighting fixtures that may not have the capability to interchange components in the field to change light output characteristics. The current subject matter's modular optical electrical assembly and lighting fixture housing may be length-adjusted at one end to reduce its overall length (e.g., from a starting length of up to 96" to a minimum length of 21").

Figure 9A:
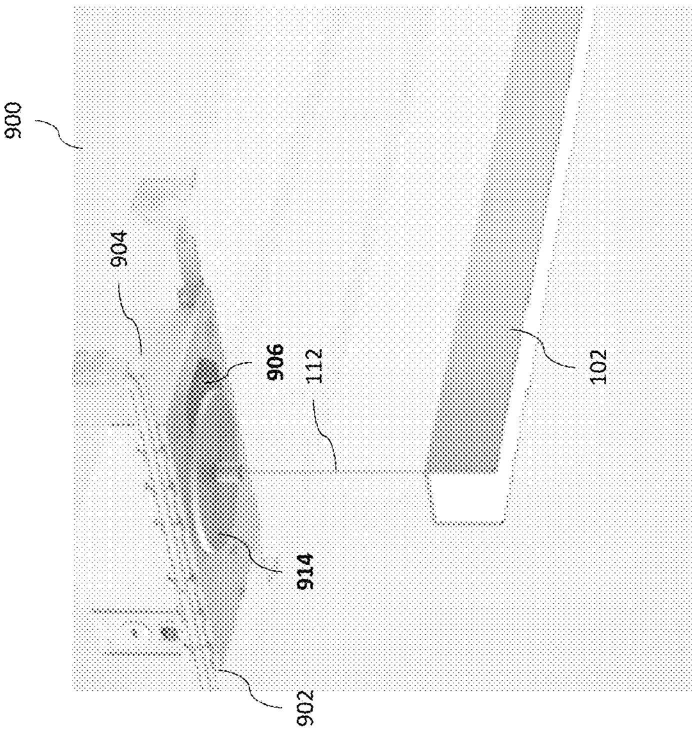
FIGS. 9*a*-9*b* illustrates a lighting fixture system, according to some implementations of the current subject matter.
Figure 9B:
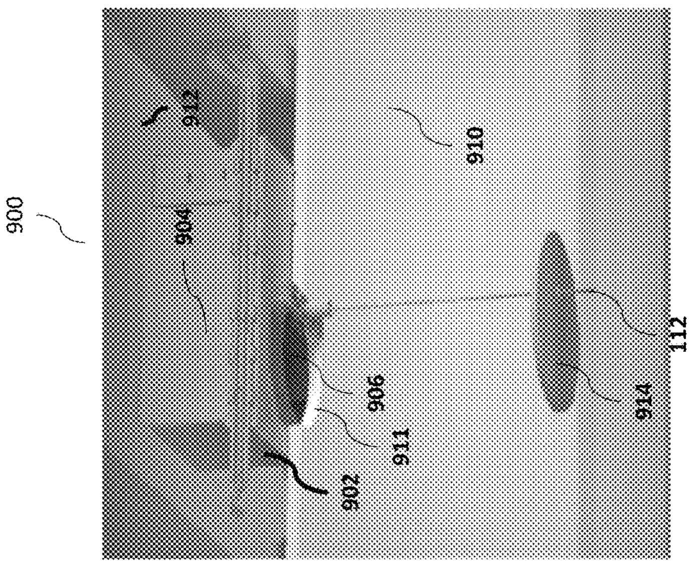

FIGS. 9*a*-9*b* illustrates a lighting fixture system 900, according to some implementations of the current subject matter. The lighting fixture system 900 may include one or more lighting fixture housings 102 that may enclose any of the components discussed above in connection with FIGS. 1-8*b* electrically and mechanically coupled to a source of electrical power 902. The mechanical coupling of the lighting fixture housing 102 and the source of electrical power 902 may be accomplished using one or more connectors 112 that may physically suspend the lighting fixture housing 102 from the source of electrical power 902. The electrical coupling of the lighting fixture housing 102 and the source of electrical power 902 may be via one or more electrical wires that may be protruded through an interior of the connectors 112.

The source of electrical power 902 may include a housing 904 having an opening 906 and one or more electrical components (e.g., one or more LED drivers) that may be needed for operating the lighting fixture connected to the source of electrical power 902. The source of electrical power 902 may also be electrically coupled to an electrical main (not shown in FIGS. 9*a-b*), however, all electrical components needed for operation of the lighting fixture connected to it may be disposed within the housing 904. Such electrical components may also be easily accessible via an opening 906. The opening 906 may also coincide with a ceiling opening 911 that may be created at a location of mounting of the housing 904 in the space 912. For example, the housing 904 may be mounted to a structural element of a building (e.g., a cross-beam, a support beam, etc.). The ceiling opening 911 and, thus, the opening 906, may be covered (when not in use for serving/repair/replacement/etc. of electrical components within the housing 904) by a cover 914. The cover 914 may be slidably disposed along with the connector 112 and may be secured proximate to the ceiling opening 911 when there is no need to access interior of the housing 904. When servicing/repair/replacement of one or more electrical components of the source of electrical power 902 is needed, the cover 914 may be pulled (e.g., in a downward direction) along the connector 112 and/or rotated away to expose openings 911 and 906 allowing access to the electrical components.

In some implementations, as shown in FIG. 9*b*, the connector 112 may be configured to be coupled (either to the housing 904 of the source of electrical power or to the ceiling 910) at an offset from the center of the opening 906 and/or the ceiling opening 911 (e.g., at an edge of the opening 906/opening 911 and/or outside of the opening 906/opening 911 (e.g., through a separate opening in the ceiling and/or the housing 906)). Such offset-based coupling may further allow ease of unobstructed access to the interior of the housing 904 of the source of electrical power 902. In some example implementations, the connector 112 may only be coupled to the ceiling 910 and not the housing 904. As can be understood, any type of coupling of the connector 112 may be used. Further, the connector 112 may also protrude through the cover 914 at a location that may be at an offset from the center of the cover 914 (e.g., at an edge of the cover 914), as shown in FIG. 9*b*. When access to the housing 904 is required, the cover 914 may be fully rotated away and/or pulled down along the connector 112 to allow unrestricted access to the housing 904 through the opening 906. Alternatively, or in addition, the connector 112 may protrude through the center of the cover 914 and/or at any other location on the cover 914.

The current subject matter's use sources of electrical power that may be locally positioned to lighting fixture provides numerous beneficial features. Existing LED fixture systems typically include an LED driver that may be located far away from the suspended lighting fixture's housing and may have driver enclosures above the ceiling that may require ceiling access to service the LED drivers and/or may require a remote enclosure for placement of the LED drivers. The current subject matter's system may provide an LED driver that may be placed above the ceiling directly above the canopy of a connector suspended lighting fixture without disturbing the connector mounting. The connector mounting locations at the ceiling may be offset from the center of the canopy and/or center of the ceiling opening, whereas connector mounting locations area typically concentric to the canopy, thereby providing an unobstructed access into the ceiling. The offset of the suspension connectors from the center of the ceiling opening and/or the center of the canopy may prevent obstruction of ceiling access during service of the LED driver without disturbing the connector suspension system.

In some implementations, the above arrangement of the connector 112 with respect to the source of electrical power 902 may be beneficial in providing unrestricted access to the source of electrical power. At the outset, having the source of electrical power proximate to the lighting fixture eliminates remote location/locating of such sources (as in conventional systems) when service of the sources is required (e.g., replacement of LED driver), thereby reducing service time and easing burdens associated with assessing malfunction issues. Moreover, as stated above, having connector (e.g., connector 112) mounting locations at the ceiling that are offset from the center of the ceiling canopy (e.g., cover 914 covering opening 906/opening 911) and/or non-concentrically mounted to the ceiling canopy and/or with respect to the opening in the ceiling, allows for ease of access to and serving of electrical components within the locally positioned sources of electrical power. This may be accomplished through sliding the ceiling canopy (e.g., cover 914) down along the connector 112 without disturbing the connector and/or other electrical wiring either at the ceiling and/or the lighting fixture.

The foregoing description has broad application. While the present disclosure refers to certain implementations, numerous modifications, alterations, and changes to the described implementations are possible without departing from the sphere and scope of the present disclosure, as defined in the appended claim(s). Accordingly, it is intended that the present disclosure not be limited to the described implementations. Rather these implementations should be considered as illustrative and not restrictive in character. All changes and modifications that come within the spirit of the current subject matter are to be considered within the scope of the disclosure. The present disclosure should be given the full scope defined by the language of the following claims, and equivalents thereof. The discussion of any implementation is meant only to be explanatory and is not intended to suggest that the scope of the disclosure, including the claims, is limited to these implementations. In other words, while illustrative implementations of the disclosure have been described in detail herein, it is to be understood that the inventive concepts may be otherwise variously embodied and employed, and that the appended claims are intended to be construed to include such variations, except as limited by the prior art. Unless otherwise defined, all technical terms used herein have the same meaning as commonly understood by one of ordinary skill in the art to which the disclosure belongs.

Directional terms such as top, bottom, superior, inferior, medial, lateral, anterior, posterior, proximal, distal, upper, lower, upward, downward, left, right, longitudinal, front, back, above, below, vertical, horizontal, radial, axial, clockwise, and counter-clockwise) and the like may have been used herein. Such directional references are only used for identification purposes to aid the reader's understanding of the present disclosure. For example, the term "distal" may refer to the end farthest away from the medical professional/operator when introducing a device into a patient, while the term "proximal" may refer to the end closest to the medical professional when introducing a device into a patient. Such directional references do not necessarily create limitations, particularly as to the position, orientation, or use of this disclosure. As such, directional references should not be limited to specific coordinate orientations, distances, or sizes, but are used to describe relative positions referencing particular implementations. Such terms are not generally limiting to the scope of the claims made herein. Any implementation or feature of any section, portion, or any other component shown or particularly described in relation to various implementations of similar sections, portions, or components herein may be interchangeably applied to any other similar implementation or feature shown or described herein.

It should be understood that, as described herein, an "implementation" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated implementations are to be understood as examples (unless otherwise stated), and other manners of embodying the described concepts or features, such as may be understood by one of ordinary skill in the art upon learning the concepts or features from the present disclosure, are within the scope of the disclosure. Furthermore, references to "one implementation" of the present disclosure are not intended to be interpreted as excluding the existence of additional implementations that also incorporate the recited features.

In addition, it will be appreciated that while the Figures may show one or more implementations of concepts or features together in a single implementation of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one implementation can be used separately, or with another implementation to yield a still further implementation. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited. It will be further understood that the terms "includes" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

The phrases "at least one", "one or more", and "and/or", as used herein, are open-ended expressions that are both conjunctive and disjunctive in operation. The terms "a" (or "an"), "one or more" and "at least one" can be used interchangeably herein.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more implementations or configurations for the purpose of streamlining the disclosure. However, it should be understood that various features of the certain implementations or configurations of the disclosure may be combined in alternate implementations or configurations. Moreover, the following claims are hereby incorporated into this detailed description by this reference, with each claim standing on its own as a separate implementation of the present disclosure.

What is claimed:

1. A lighting apparatus, comprising:

a housing having a first housing sidewall and a second housing sidewall, the first and second housing sidewalls each having a first end and a second end; and a lighting lens housing having a first lens sidewall, a second lens sidewall, and a lens panel having a first end and a second end, wherein the lens panel is disposed between the first and second lens sidewalls, and wherein at least one of the first and second lens sidewalls is configured to block transmission of light;

wherein the lighting lens housing is configured to be attached to the housing, wherein, upon attaching the lighting lens housing to the housing, the first end of the lens panel is offset from the first end of the first housing sidewall and the first end of the second housing sidewall.

2. The apparatus of claim 1, wherein a first end of each of the first and second lens sidewalls is offset from the first end of the first housing sidewall and the first end of the second housing sidewall, respectively.

3. The apparatus of claim 1, wherein the second end of the lens panel is offset from the second end of the first housing sidewall and the second end of the second housing sidewall.

4. The apparatus of claim 3, wherein the first end of the lens panel is configured to extend beyond the first ends of the first and second housing sidewalls; and the second ends of the first and second housing sidewalls are configured to extend beyond the second end of the lens panel.

5. The apparatus of claim 3, wherein the first end of the lens panel is configured to extend beyond the first ends of the first and second housing sidewalls; and the second end of the lens panel is configured to extend beyond the second ends of the first and second housing sidewalls.

6. The apparatus of claim 3, wherein the first ends of the first and second housing sidewalls are configured to extend beyond the first end of the lens panel; and the second ends of the first and second housing sidewalls are configured to extend beyond the second end of the lens panel.

7. A lighting system, comprising:

a first lighting apparatus and a second lighting apparatus, each of the first and second lighting fixtures having a housing having a first housing sidewall and a second housing sidewall, the first and second housing sidewalls each having a first end and a second end; and a lighting lens housing having a first lens sidewall, a second lens sidewall, and a lens panel having a first end and a second end, wherein the lens panel is disposed between the first and second lens sidewalls, and wherein at least one of the first and second lens sidewalls is configured to block transmission of light;

wherein the lighting lens housing is configured to be attached to the housing, wherein, upon attaching the lighting lens housing to the housing, the first end of the lens panel is offset from the first end of the first housing sidewall and the first end of the second housing sidewall;

upon connection of the first lighting apparatus and the second lighting apparatus, the first ends of the first and second housing sidewalls of the housing of the first lighting apparatus form a first joint with the second ends of the first and second housing sidewalls of the housing of the second lighting apparatus, the first end of the lens panel of the lighting lens of the first lighting apparatus forms a second joint with the second end of the lens panel of the lighting lens of the second lighting apparatus, the first joint is offset from the second joint.

* * * * *